(12) United States Patent
Binstead

(10) Patent No.: US 10,534,487 B2
(45) Date of Patent: Jan. 14, 2020

(54) TOUCH SENSOR

(71) Applicant: Ronald Peter Binstead, Nottingham (GB)

(72) Inventor: Ronald Peter Binstead, Nottingham (GB)

( * ) Notice: Subject to any disclaimer, the term of this patent is extended or adjusted under 35 U.S.C. 154(b) by 20 days.

(21) Appl. No.: 15/746,265

(22) PCT Filed: Jul. 21, 2016

(86) PCT No.: PCT/GB2016/052216
§ 371 (c)(1),
(2) Date: Jan. 19, 2018

(87) PCT Pub. No.: WO2017/013437
PCT Pub. Date: Jan. 26, 2017

(65) Prior Publication Data
US 2018/0217696 A1 Aug. 2, 2018

(30) Foreign Application Priority Data

Jul. 21, 2015 (GB) .................................. 1512812.7

(51) Int. Cl.
*G06F 3/044* (2006.01)
*G06F 3/047* (2006.01)
(52) U.S. Cl.
CPC .............. *G06F 3/044* (2013.01); *G06F 3/047* (2013.01)
(58) Field of Classification Search
CPC ... G06F 3/041–047; G06F 2203/04101–04113
See application file for complete search history.

(56) References Cited

U.S. PATENT DOCUMENTS

| 9,122,358 | B2* | 9/2015 | Liu | ........................ G06F 3/0416 |
| 2007/0279395 | A1* | 12/2007 | Philipp | .............. G01R 27/2605 345/173 |
| 2008/0225011 | A1* | 9/2008 | Ito | .......................... G06F 1/1616 345/173 |
| 2010/0156795 | A1* | 6/2010 | Kim | ...................... G06F 3/0416 345/168 |
| 2010/0245246 | A1 | 9/2010 | Rosenfeld et al. | |
| 2011/0018838 | A1 | 1/2011 | Lee | |
| 2011/0032193 | A1* | 2/2011 | Szalkowski | ............. G06F 3/044 345/173 |

(Continued)

FOREIGN PATENT DOCUMENTS

| CN | 103440076 | 12/2013 |
| DE | 202011052530 | 2/2012 |

(Continued)

OTHER PUBLICATIONS

United Kingdom Patent Office Search Report for Application No. 1512812.7 dated Nov. 20, 2015, 3 pages.

(Continued)

*Primary Examiner* — Stephen G Sherman
(74) *Attorney, Agent, or Firm* — Michael Best & Friedrich LLP

(57) ABSTRACT

The disclosure relates to a touch sensor comprising: a sensing area having a central region bounded by at least one edge region that extends in an edge region direction; and a plurality of conductive elements that each extend through the central region in a direction that is oblique to the edge region direction.

19 Claims, 20 Drawing Sheets

(56) References Cited

U.S. PATENT DOCUMENTS

| | | |
|---|---|---|
| 2012/0062250 A1 | 3/2012 | Kuo |
| 2012/0193130 A1 | 8/2012 | Fix et al. |
| 2012/0206379 A1* | 8/2012 | Ho .................. G06F 3/044 345/173 |
| 2013/0127771 A1 | 5/2013 | Carley et al. |
| 2014/0218645 A1 | 8/2014 | Miyamoto |
| 2014/0291008 A1* | 10/2014 | Huang .............. H05K 1/0296 174/268 |
| 2014/0299357 A1 | 10/2014 | Nakamura |
| 2014/0299361 A1 | 10/2014 | Nakamura et al. |
| 2015/0212548 A1* | 7/2015 | Namkung ......... G06F 1/1652 345/174 |
| 2016/0209954 A1* | 7/2016 | Cho .................. G06F 3/044 |

FOREIGN PATENT DOCUMENTS

| | | |
|---|---|---|
| JP | 2010286886 | 12/2010 |
| WO | 2007013499 | 2/2007 |
| WO | 2007128972 | 11/2007 |

OTHER PUBLICATIONS

International Search Report and Written Opinion for Application No. PCT/GB/2016/052216 dated Oct. 20, 2016, 10 pages.

* cited by examiner

Standard x/y matrix for a 5x5 touch-sensor.
Requires 10 terminations for 25 intersections Standard termination for a diagonal matrix
Requires 14 terminations for 25 intersections One possible example of a complex inter-digitated node

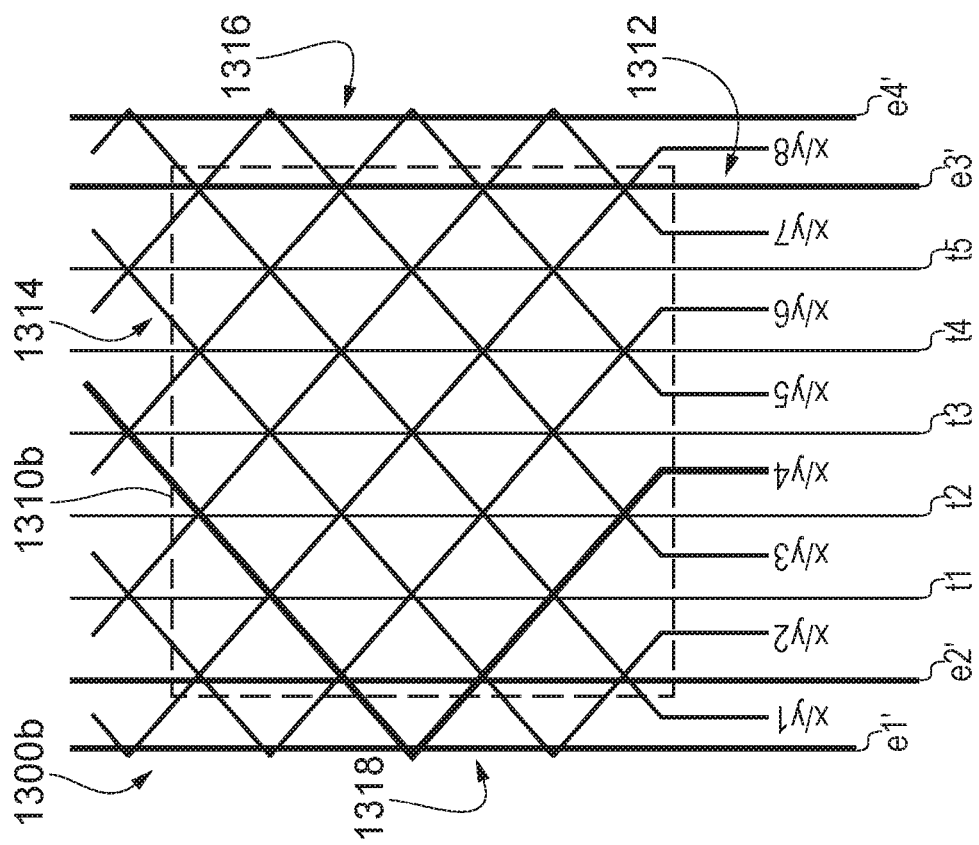
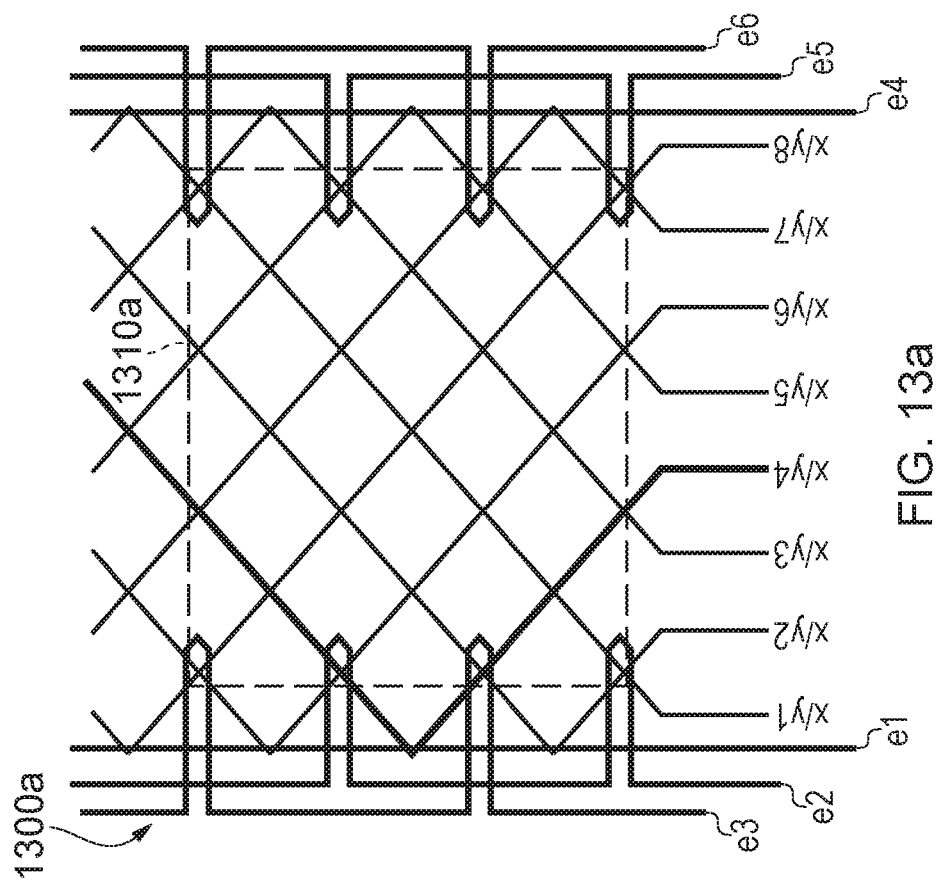
FIG. 13b
FIG. 13a shows how a set of elements (y) may be routed through the sensing area several times, while maintaining only one intersection with any of the other (x) elements. 4x and 4y elements intersect 16 times, even though they are routed diagonally. y4 is emphasised for clarity purposes.

Shows how both ends of a single wire (1504) can terminate at a single electrically conductive terminal 1524

Although only x/y4 has been shown in detail, other wires may have a similar construction (x/y4 has been emphasised to show the route of this element)

Touch sensor with 8 conductive elements forming 56 cross-over nodes in the sensing region

TOUCH SENSOR

CROSS-REFERENCE TO RELATED APPLICATIONS

This is a U.S. national stage entry of International Patent Application No. PCT/GB2016/052216, filed on Jul. 21, 2016, which claims priority to Great Britain Patent Application No. 1512812.7, filed Jul. 21, 2015, the entire contents of all of which are fully incorporated herein by reference.

The invention relates to touch sensors and in particular, although not exclusively, to proximity sensing capacitive touch-sensing fabrics, films and touch-screens for the detection and accurate position determination of one or more fingers or other conductive objects, with or without the use of a visual display.

Many capacitive touch-screen technologies have a horizontal/vertical (x/y) array of sensing elements, or sensing and driven elements. Projected capacitance sensing techniques that rely on the measurement of self-capacitance or mutual capacitance may be used in order to determine a touch position. "Self capacitance" may be used for determining the unambiguous position of just one finger, the finger position being determined by the horizontal and vertical conductive elements that show a maximum change when the finger approaches. It may also be used for the detection of multiple fingers, but usually, though not always, with some degree of ambiguity. "Mutual capacitance" may be used to determine the unambiguous position of one or more fingers. In mutual capacitive methods, known techniques are employed that only enable intersections between sensing and controlling elements to detect a finger approaching that intersection. These intersections are called nodes. The remainder of these elements is insensitive to the approaching finger. The finger positions may be determined by finding intersections of the horizontal (x) and vertical (y) conductive elements that show a significant change in signal transmission between these elements (for example, from horizontal controllable to vertical sensing elements) when a finger approaches that intersection thereby causing a change in the capacitive coupling between these elements.

FIG. 1 shows an example of a capacitive touch sensor 100 with a simplified standard layout of 10 conductive elements arranged in a 5×5 grid of vertical/horizontal elements arranged in a square sensing area 109.

All conductive elements are electrically isolated from each other and from the user.

In FIG. 1, 10 terminals are provided, one terminal for each conductive element. Five horizontal elements y1-y5 cross five vertical elements x1-x5 to form a matrix of 25 crossover points. The horizontal elements y1-y5 may be quite different in length to the vertical elements x1-x5.

Two fingers F1, F2 are shown touching the touch sensor 100. A first finger F1 is shown between second and third horizontal elements y2, y3 and between second and third vertical elements x2, x3. A second finger F2 is shown at an intersection, or cross over, between a fourth horizontal element y4 and a fourth vertical element x4.

A variety of electronic circuits can be connected to the conductive elements x1-x5, y1-y5 in order to determine the positions of the two fingers F1, F2 touching the touch sensor 100. In "self" capacitance mode, both the x and the y elements are touch sensitive, but the x elements may be quite different in sensitivity to the y elements.

The first finger F1 has similar capacitive coupling to the second and third vertical elements x2, x3 due to the orientation of the finger, which is equally spaced between the second and third vertical elements x2, x3. Capacitive coupling of the first finger F1 to the second and third horizontal elements y2, y3, however, is significantly different. The capacitive coupling of the first finger F1 to the third horizontal element y3 is very strong, due to the finger sloping over that element, but the capacitive coupling to the second horizontal element y2 is very weak because the finger slopes away from the second horizontal element y2. Sensing using the touch sensor 100 is therefore asymmetric due to the orientation of the finger F1 with respect to the touch sensor 100.

A touch screen may be provided that comprises the touch sensor 100 and a display. The display has a display area that is aligned with respect to the sensing area 109 of the touch sensor 100. The conductive elements x1-x8, y1-y8 are therefore arranged parallel to the edges of the display area. The display area comprises an array of picture elements (pixels) arranged in columns and rows. The first and second sets of conductive elements x1-x8, y1-y8 of the touch screen 100 also extend parallel to the rows and columns of pixels. This may cause Moire interference patterns if wire is used as the conductive element.

In order to resolve the positions of a large number of fingers, or many fingers very close together, a large number of intersections are required for an x/y touch sensor such as that described with reference to FIG. 1. As such, hundreds of x and y elements may be required for a large, high resolution multi-touch touch-screen. Conductive "feed" tracks may be required to connect these x and y elements to the electronic circuit. Many of these "feed" tracks may have to run around the outer edge of the sensing area 109, restricting the ability to sense very close to some edges of a touch-screen. The more x and y elements that are used, the more tracks that are needed and, therefore, the wider a non-sensing zone is formed around the edge of the touch-screen. For many applications where it is desirable that the size of the non-sensing zone is minimized, one way of addressing this problem is to have multiple connectors around the edges of the touch sensor, with multiple controller boards. Disadvantages of such an approach are increased complexity, and a need to provide space and connections around all sides of the touch-screen.

According to a first aspect there is provided a touch sensor comprising:
- a sensing area having a central region bounded by at least one edge region that extends in an edge region direction; and
- a plurality of conductive elements that each extend through the central region in a direction that is oblique to the edge region direction.

The central region of the sensing area may be bounded by a first edge region, a second edge region that opposes the first edge region, and a third edge region that extends between the first edge region and the second edge region. The plurality of conductive elements may comprise a first set of conductive elements that each extend through the central region from the first edge region to the second edge region via the third edge region. The conductive elements of the first set may each change direction at the third edge region. The central region of the sensing area may be bounded by a fourth edge region that extends between the first edge region and the second edge region and opposes the third edge region. The sensing area or the central region of the sensing area may be square or rectangular. The plurality of conductive elements may comprise a second set of conductive elements that each extend from the first edge region to the second edge region via the fourth edge region.

The conductive elements of the second set may each change direction at the fourth edge region. The first set of conductive elements may pass through the third edge region only once. The second set of conductive elements may pass through the fourth edge region only once.

The first and second sets of conductive elements may form a matrix of cross over points. The edge regions may form a periphery around the bounds of the matrix of cross over points. The first set of conductive elements may be interdigitated with the second set of conductive elements at the first edge region.

The first set of conductive elements may be a set of controllable conductive elements. The first set of conductive elements may be a set of sensing conductive elements. The second set of conductive elements may be a set of controllable conductive elements. The second set of conductive elements may be a set of sensing conductive elements. The first and second sets of conductive elements may each be a mixture of controllable and sensing elements.

The first set of conductive elements may be configured to be connected to circuitry at the first edge region. Likewise, the second set of conductive elements may be configured to be connected to circuitry at the first edge region. The first set and/or second set of conductive elements may be configured to be connected to circuitry at both the first and the second edge regions.

The conductive elements of the first set may each have a non-linear portion. The non-linear portion of the first set may be in the central region, between the third edge region and the first or second edge regions. The conductive elements of the second set may each have a non-linear portion. The non-linear portion of the second set may be in the central region, between the fourth edge region and the first or second edge regions.

The first set of conductive elements may cross over each of the other conductive elements only once. The conductive elements may comprise one or more of: metallic wire or a conductive track. The conductive element may be insulation coated. The conductive elements may each have two ends. The conductive elements may each be configured to be connected to circuitry at only one of the two ends or at both ends.

The plurality of conductive elements may comprise a third set of conductive elements. The third set of conductive elements may extend along one or more of the edge regions of the sensing area, or within the sensing area. The third set of conductive elements may extend between the third edge region and the fourth edge region. The third set of conductive elements may extend between the first edge region and the second edge region. The third set of conductive elements may extend diagonally diagonal with respect to a direction in which the first or second edge region extends. The third set of conductive elements may extend in parallel to portions of the first or second sets of conductive elements. The plurality of conductive elements may comprise a fourth set of conductive elements that extends along one or more of the edge regions of the sensing area. The third set and/or fourth set of conductive elements may be linear (straight) or non-linear (bent).

The conductive elements may comprise one or more of: sensing conductive elements, controllable conductive elements, masking conductive elements, shielding conductive elements and electrically isolated elements or be left electrically floating.

The touch sensor may comprise circuitry connected to the conductive elements. The circuitry may be configured to determine one or more touch positions in the sensing area.

The plurality of conductive elements may comprise a first set of conductive elements that passes through the central region of the sensing area once. The plurality of conductive elements may comprise a second set of conductive elements. Each of the conductive elements of the second set may intersect each of the conductive elements of the first set only once within the central region of the sensing area. Each of the conductive elements of the second set may pass through the central region of the sensing area a plurality of times.

The central region of the sensing area may be bounded by a first edge region, a second edge region that opposes the first edge region, a third edge region that extends between the first edge region and the second edge region, and fourth edge region that extends between the first edge region and the second edge region and opposes the third edge region. The first set of conductive elements may extend between the first and second edge regions. The second set of conductive elements may have a first portion that extends between the first edge region and the third edge region. The second set of conductive elements may have a second portion that extends between the second edge region and the fourth edge region.

According to a further aspect there is provided a touch screen comprising:
 a display screen having a display area; and
 the touch sensor of any preceding claim, in which the sensing area may be aligned with the display area.

The sensing area may be aligned with the display area such that the plurality of conductive elements each extend through the central region in a direction that may be oblique to-an edge of the display area. The display area may comprise an array of picture elements having columns and rows of picture elements. One or more of the first, and second sets of conductive elements of the touch screen may extend obliquely, or diagonally, to a row or column of picture elements.

According to a further aspect there is provided a single or multi-touch touch-screen composed of multiple sensing and/or controlling elements, wherein the sensing and/or controlling elements are arranged diagonally to the orientation of the sensing/display area, a number of these elements running in a first direction from a first edge of the sensing area, until they reach a second edge of the sensing area, then running in a second direction, until they reach a third edge of the sensing area which may be parallel to the first edge.

Neighbouring elements may run diagonally in opposing directions. Such elements may form a matrix of cross-over points, or nodes, between the multiple sensing and/or controlling elements within the sensing area. Every element may cross every other element at one unique node within the sensing area, for each and every pair of elements. All the elements may be connected to a terminal at one edge of the sensing area only or at two opposing edges. No "feed wires" may be necessary down the other two edges of the sensing area.

Some or all of the elements may be terminated at one edge of the sensing area, with no "feed" tracks being necessary along the other three edges. Alternatively, elements may be terminated at two opposing edges of the sensing area.

The sensing and/or controlling and/or shielding elements may be wire.

Extra elements may run along the edges of the sensing area to increase the number of sensing positions along those edges. Angles between the different elements may be varied to fit all the elements within the sensing area. Some (potentially viable) cross-over points may be excluded in order to fit all the remaining elements within the sensing/display area. Extra diagonal elements may be inserted within the matrix of elements in order to extend one of the dimensions of the sensing/display area. The angle of the elements may change one or more times within the sensing/display area. The sensing area may be larger or smaller than the display area. The wire elements may be non-linear. The wire elements may fold back on themselves one or more times in order to increase their "effective" width and/or reduce Moirre interference. The sensing and/or controlling elements may be arranged diagonally to the orientation of the display area. Two or more wire elements may run in parallel to each other, forming a single conductive element in order to increase the "effective" width and/or reduce to resistance of the conductive element. Each conductive element may be sampled at both ends at the same time and treated as a single element, or sampled at each end separately as though it was two separate elements, the results being combined to produce one common reading.

The first set of conductive elements may be connected to circuitry only at the first edge region. The second set of conductive elements may be connected to circuitry only at the first edge region. The first set of conductive elements may be connected to circuitry at both the first edge region and the second edge region. The second set of conductive elements may be connected to circuitry at both the first edge region and the second edge region.

Each wire element may be folded back on itself at the second edge and may return to the first edge, via a similar/parallel path to its first and second directions. On reaching the first edge, both ends of the wire element may be connected to the same terminal.

Each conductive element may comprise two or more wire elements connected to the same terminal at the first edge. Each conductive element may consist of one or more wire elements connected at a first end to one terminal at the first edge and connected at a second end to another terminal at the second edge. The terminals at the first edge and/or the second edge may be joined together by conductive tracks that run outside the sensing area. The conductive tracks may be within the same supporting film/fabric as the touch sensor. The conductive tracks may be a separate conductive ribbon lead outside the supporting film/fabric.

Conductive elements connected to terminals at the first edge may be treated as independent conductive elements to those same elements that are connected to terminals at the second edge. The results of sensing a conductive element from the first end may be compared with the results of sensing the conductive element from the second end. The two measurements may be combined.

Each conductive element may have one or more, or all, of multiple different functions at different times. Each conductive element may comprise a plurality of sub-elements for providing parallel, electrically conductive paths. The plurality of sub-elements associated with a particular conductive element may have a common termination.

The central region of the sensing area may be bounded by a first edge region, a second edge region that opposes the first edge region, a third edge region that extends between the first edge region and the second edge region, and a fourth edge region that opposes the third edge region. The plurality of conductive elements may comprise a first set of conductive elements that each extend through the central region from the first edge region to the fourth edge region via the third edge region. The conductive elements of the first set may each change direction at the third edge region, extending through the central region to the second edge region via the fourth edge region, in which the conductive elements of the first set each change direction at the fourth edge region.

The plurality of conductive elements may comprise a second set of conductive elements that each extend through the central region from the first edge region to the third edge region via the fourth edge region. The conductive elements of the second set each change direction at the fourth edge region, extending through the central region to the second edge region via the third edge region, in which the conductive elements of the first set each change direction at the third edge region.

The conductive elements may extend through the central region from the first edge region to the second edge. The conductive elements may change direction at the third and fourth edges.

The plurality of conductive elements may comprise a first set of conductive elements, that each extend through the central region from the first edge region to the third edge region, from the third edge region to the fourth edge region, and from the fourth edge region to the second edge region. The plurality of conductive elements may comprise a second set of conductive elements that each extend through the central region from the first edge region to the fourth edge region, from the fourth edge region to the third edge region, and from the third edge region to the second edge region.

The first and second sets of conductive elements form a matrix of cross over points within the sensing region, each conductive elements crossing every other conductive element a maximum of two times, whereby, if the total number of conductive elements is n, the maximum number of cross-over nodes, within the sensing region, is $n^2-n$.

Duplicate cross-over nodes may be disambiguated by a number of different methods. Ambiguity can be avoided by ensuring that each conductive elements crosses every other conductive element once only, whereby, if the total number of conductive elements is n, the maximum number of cross-over nodes, within the sensing region, is $(n^2-n)/2$. More than two conductive elements may converge at a cross-over node.

According to a further aspect there is provided a capacitive touch sensor with multiple intersecting conductive elements forming cross-over nodes. Each cross-over node may be composed of (exactly) two isolated intersecting conductive elements. Any two nodes with the same two intersecting conductive elements may be distinguished from each other by the asymmetric layout of the conductive elements.

According to a further aspect there is provided a matrix of conductive elements forming a plurality of nodes at intersections of the conductive elements, in which one or more of the nodes is formed by three conductive elements crossing over each other, with no direct electrical connection between each of the conductive elements of the respective node.

According to a further aspect there is provided a capacitive touch sensor comprising a matrix of conductive elements forming a plurality of cross-over nodes at intersections of the conductive elements, in which one or more of the cross-over nodes is formed by three or more, or exactly three, conductive elements crossing over each other, with no direct electrical connection between the conductive elements at each of the plurality of cross-over nodes.

The touch-screens described can work in "self" capacitance mode, "mutual" capacitance mode, or a combination of both modes.

A description is now given, by way of example only, with reference to the accompanying drawings, in which:

FIG. 13a shows a touch sensor similar to that described with reference to FIG. 8 in which the set of conductive elements arranged at edges of the sensing region enters a central region of the sensing area;

FIG. 13b shows an alternative arrangement to FIG. 13a, but with a different set of conductive elements that enter and pass through the sensing area;

The terminal connectors and the physical edges of the touch-sensor glass, films or fabrics, are not shown in the illustrations listed above, for clarity purposes, and because they may vary widely. There may be more than one connector, and the edge of the fabric, film or glass may be a function of the end product rather than a function of the sensing area.

Figure 1:
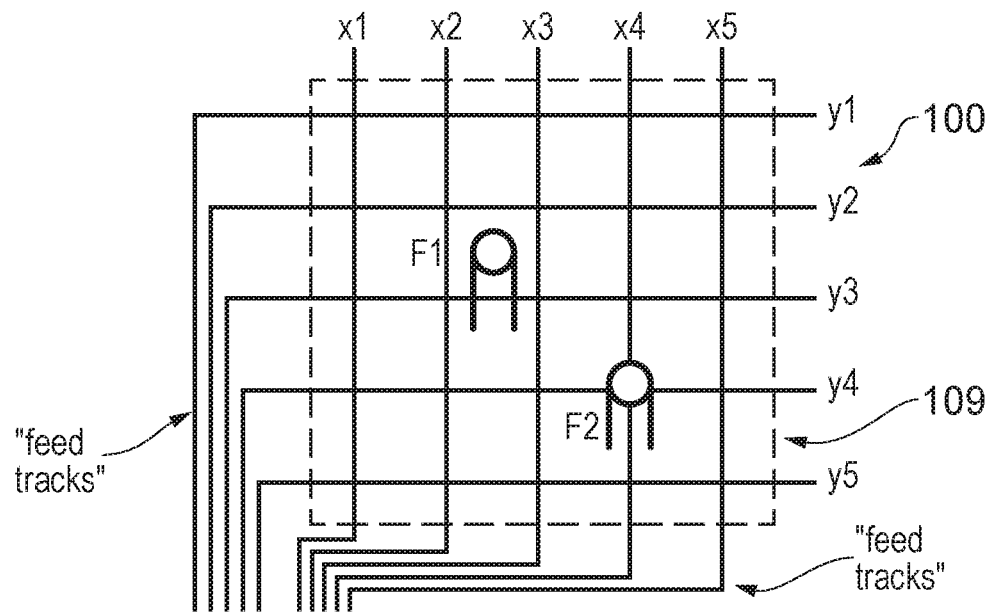
FIG. 1 shows a wiring arrangement for a touch-screen with horizontal and vertical conductive elements.
Figure 2:
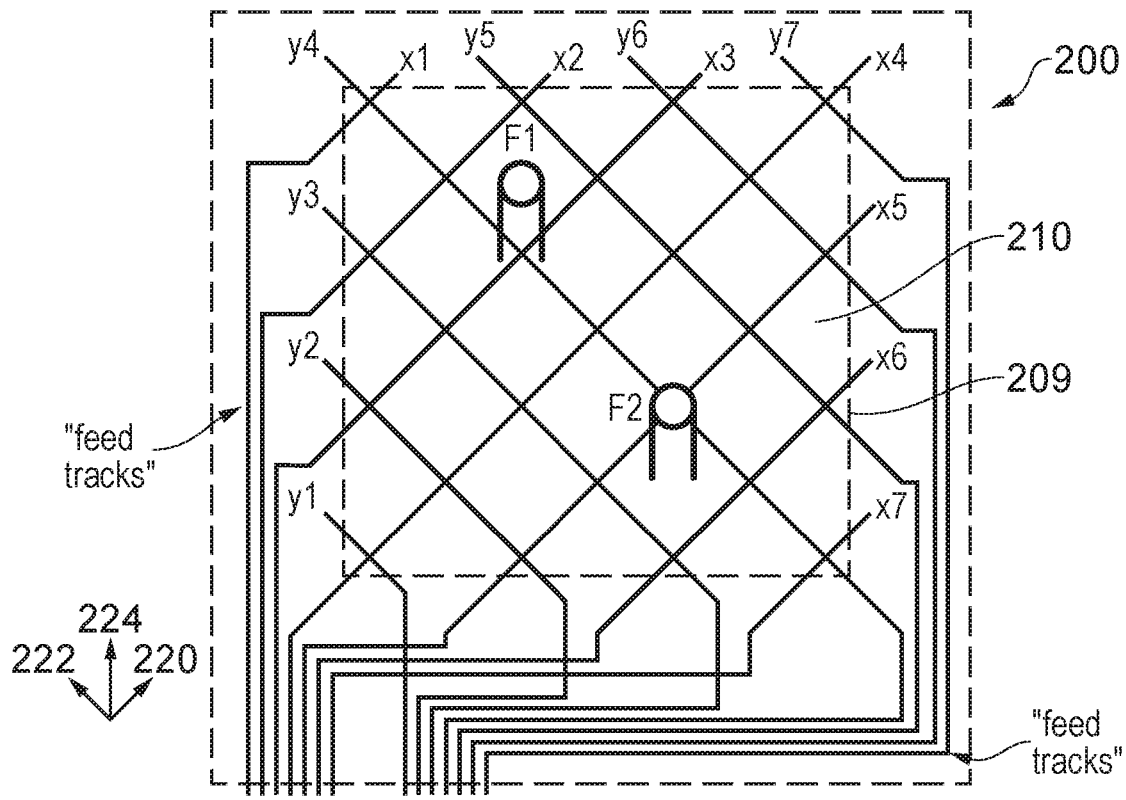
FIG. 2 shows a touch sensor with diagonal conductive elements.

FIG. 1 has already been described in some detail. A solution to the asymmetry problem encountered in FIG. 1 is to have both the x and y conductive elements orientated at 45 degrees to the orientation of the touch sensor 100 as shown in FIG. 2. One down-side to this, however, is that more tracks are needed for a given number of nodes, and many of these tracks will have to be "fed" along the sides of the touch sensor, thereby exacerbating the problem of a wide "non-touch" region around the sides touch sensor 200.

The present invention overcome the problems of asymmetrical sensing and at the same time eliminates edge "feed" wires entirely.

FIG. 2 shows a touch sensor 200 with a matrix of conductive elements x1-x7, y1-y7 that are arranged at a diagonal with respect to a sensing area 209 defined by touch sensor 200. A 7×7 array of 14 conductive elements x1-x7, y1-y7, as opposed to a 5×5 array of 10 conductive elements for example, is required for the diagonal arrangement of the touch sensor 200 in order to form 25 cross-over points and so provide the same functionality as the touch sensor described above with reference to FIG. 1. Each conductive element x1-x7, y1-y7 may be provided with a single terminal at one end.

The conductive elements x1-x7, y1-y7 include a first set of conductive elements x1-x7 that each extend in a first direction 220 and a second set of conductive elements y1-y7 that each extend in a second direction 222. The first direction 220 is orthogonal to the second direction 222. The arrangement of the first and second sets of conductive elements x1-x7, y1-y7 results in the formation of a matrix of cross over points, which may also be referred to as intersections or nodes of the touch sensor 200. The respective conducting elements x1-x7, y1-y7 remain separate, or isolated, from each other at the various nodes. The arrangement of the first and second sets of conductive elements x1-x7, y1-y7 is such that each conductive element crosses over each of the other conductive elements once or not at all.

As shown in FIG. 2, there is a wide variation in length of the conductive elements x1-x7, y1-y7. Conductive elements x1, x7, y1, y7 adjacent to corners of the touch sensor 200 are very short, whereas conductive elements x2-x6, y2-y6 that cross a central region 210 (x and y) of the touch sensor, and in particular conductive elements x4, y4 that across the very centre of the touch sensor 200, are relatively long. The variation in length of the conductive elements may cause a corresponding variation in sensitivity across the sensing area 209.

Two fingers F1, F2 are shown touching the touch sensor 200. A first finger F1 is shown between fourth and fifth conductive elements y4, y5 of the second set and between second and third conductive elements x2, x3 of the first set. A second finger F2 is shown at an intersection, or cross over, between a fourth conductive element y4 of the second set and a fifth conductive element x5 of the first set. The first and second fingers F1, F2 extend in a direction 224 that is oblique to both the first and second directions 220, 222

If the touch sensor 200 comprises touch detection circuitry configured to operate in a self capacitance mode, the first and second sets of conductive elements x1-x7, y1-y7 have very similar touch sensitivity because the geometry at the x sensing and y sensing cross-over points is identical in relation to the orientation of the first and second fingers F1, F2. That is, the orientation of the fingers F1, F2 is such that each finger's capacitive coupling with the conductive elements x and y is identical.

"Feed" tracks for, or termination of, these conductive elements is provided on three sides of the sensing area 209 of the touch sensor 200.

A touch screen may be provided that comprises the touch sensor 200 and a display. The display may have a display area that is aligned with respect to the sensing area 209 of the touch sensor 200. The conductive elements x1-x7, y1-y7 are therefore arranged obliquely to the edges of the display area. The display area comprises an array of picture elements (pixels) arranged in columns and rows. The first and second sets of conductive elements x1-x7, y1-y7 of the touch screen 200 may extend obliquely to the rows and columns of pixels.

Advantages of the diagonal arrangement of the conductive elements of the touch sensor of FIG. 2, compared to that of FIG. 1, include that—

1) If the conductive elements are wire, then vertical and horizontal wires may cause visual interference (Moire interference) between the wire and the pixel arrangement of picture elements (pixels) on the display. This interference can be mitigated, to some extent, by the wires being zig-zagged or "non-linear", or otherwise ensuring that they are at a reasonably large angle to the pixel layout. Zig-zagging, however, does mean that, intermittently, the wires are aligned with respect to the display in such way as to cause spots of interference. This spot interference can be overcome by having the whole touch-screen array at an angle to the display. This angle can be up to 45 degrees.

2) Experiments have shown that electro-magnetic interference from a display can be reduced by about 30% if the sensing elements are diagonal to the arrangement of pixels on the display.

3) In a self capacitance system in which all of the conductive elements are sensing elements, there is a significant difference in sensitivity between horizontal and vertical elements such as those of FIG. 1. However, the provision of symmetrical conductive elements that are arranged diagonally with respect to the orientation of the display screen such as those of FIG. 2 may result in all of the conductive elements being equally sensitive.

4) Conductive wires that are arranged diagonally with respect to the display screen are not as visually noticeable as conductive wires that are arranged horizontally or vertically with respect to the display screen.

Disadvantages of the diagonal arrangement of the conductive elements of the touch sensor of FIG. 2, compared to that of FIG. 1, include that—

1) The conductive elements vary in length depending on whether they cross other sensing elements near a corner or the centre of the sensing area.

2) Up to 50% more conductive elements may be required in order to provide the same number of nodes for measuring touch positions.

In the example of FIG. 2, 14 conductive elements are required to create 25 cross-over nodes, whereas 25 cross-over nodes are created with just 10 conductive elements in example of FIG. 1.

3) "Feed" tracks/termination of the conductive elements for the diagonal arrangement are more complicated and is required along two or three sides.

Figure 14A:
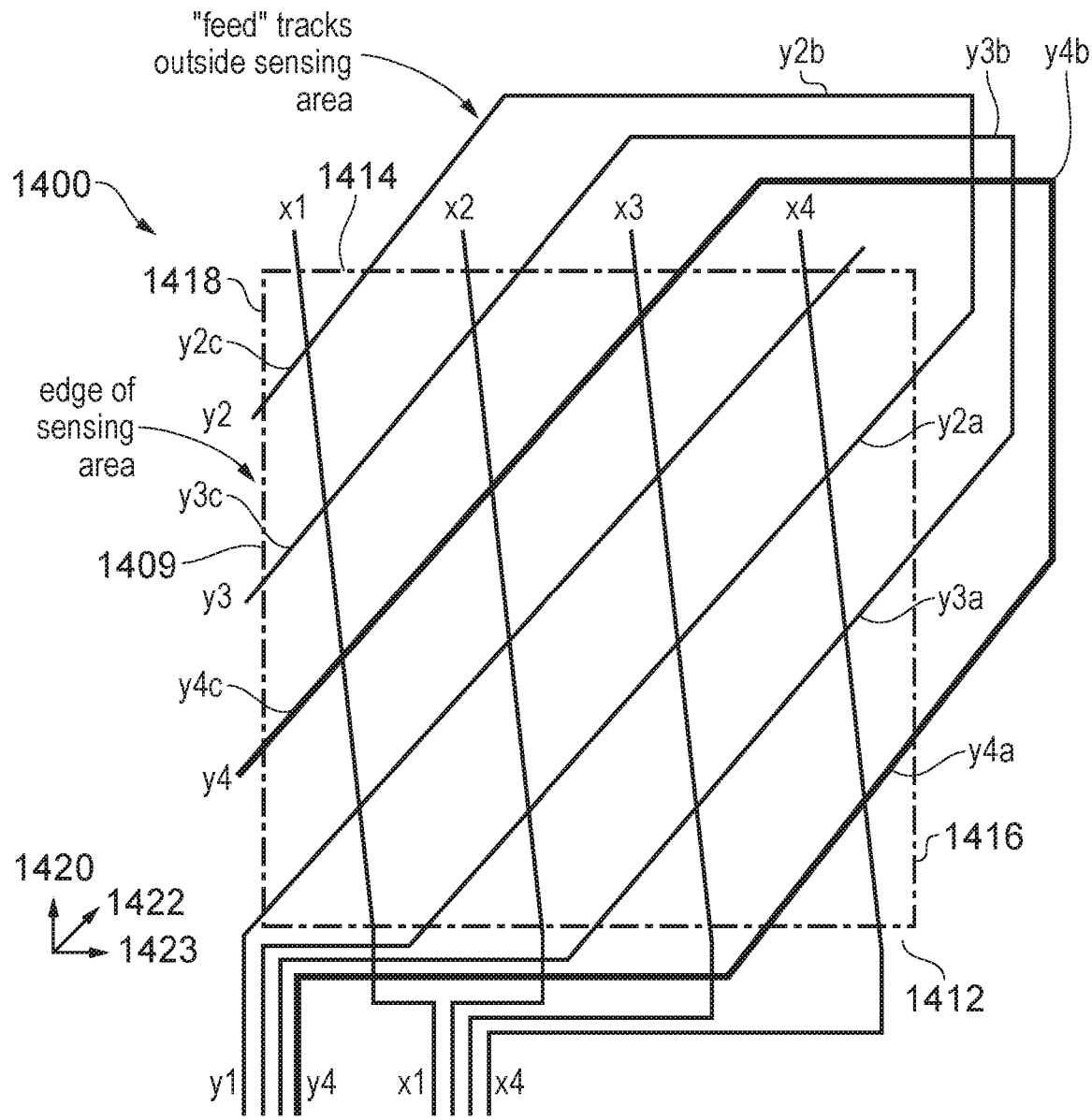
FIG. 14a show touch sensors with diagonal conductive elements that pass through a sensing region twice.

FIG. 14a, discussed further below, shows an alternative arrangement, using diagonal elements, that does not necessarily increase the number of conductive elements required for a fixed number of cross-over nodes, but requires an even more complicated "feed" track arrangement.

In order to have the advantages of diagonal conductors without the disadvantages, various examples having improved diagonal arrangements of touch elements are described with reference to FIGS. 3 to 17 below (with the exception of FIG. 14a). In at least some examples, the diagonal arrangements of FIGS. 3 to 10 reduce the number of elements that are required for a given number of intersections in comparison to the touch sensor of FIG. 1. Also, each of the elements may be of a similar length. In addition, the termination of elements may be simplified such that they can, if required, all terminate along only one side of the touch sensor. Such examples do not necessarily need to provide "feed" tracks along the edges of the sensing area and thereby significantly reduce unusable edge space around the touch-screen.

A wire may be used to provide a sensing and/or controlling element, although ITO or conductive mesh, and other materials, such as electrically conductive materials, could also be used. Insulation coated wire enables the touch-screen to be manufactured very simply in a single process (apart from final termination to a connector and any lamination) and on a single layer whereas the use of ITO may require conductive "bridges", or the deposition of up to four layers of material.

Figure 3A:
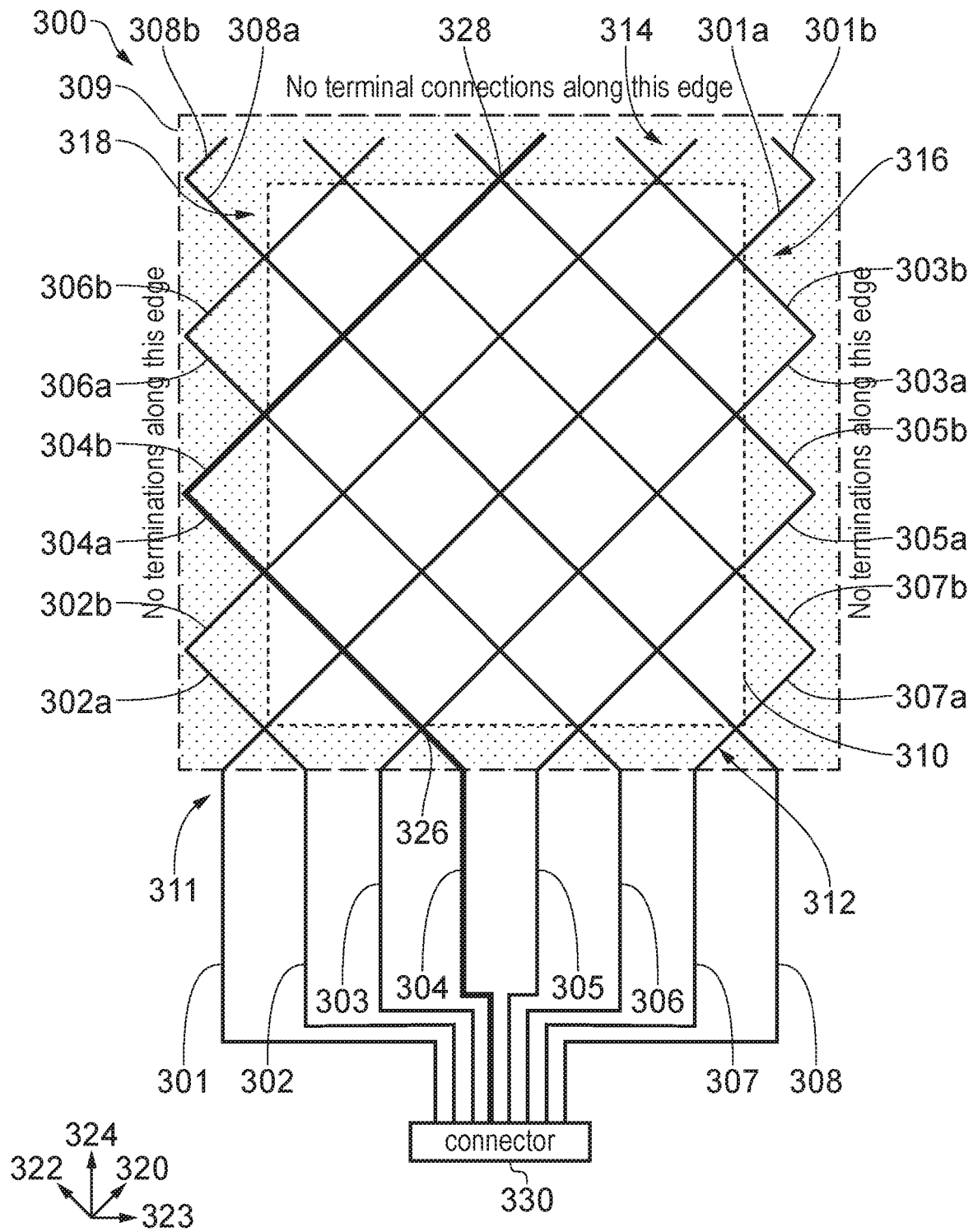
FIG. 3a shows a touch sensor with a diagonal arrangement of conductive elements that change direction within-a sensing area.

FIG. 3a shows a touch sensor 300 with a diagonal arrangement of conductive elements 301-308 arranged in a sensing area 309. An advantage of the touch sensor 300 compared to the touch sensor of FIG. 2 is that the touch sensor 300 provides 28 intersections, or nodes, using only 8 conductive elements 301-308. The touch sensor 300 therefore has a higher node to conductive element ratio than the touch sensors of FIGS. 1 and 2.

The touch sensor 300 may be a capacitive touch sensor, such as a projected capacitance touch sensor. The touch sensor 300 may comprise circuitry (not shown) connected to the conductive elements 301-308 and configured to determine one or more touch positions in the sensing area based on signals from the conductive elements 301-308. The circuitry may operate using either mutually capacitive or self-capacitive principles, or both alternately, such that the touch sensor 300 is a mutual capacitive touch sensor and/or a self-capacitive touch sensor. For example, the first set of conductive elements 301, 303, 305, 307 may be a set of controllable conductive elements and the second set of conductive elements 302, 304, 306, 308 may be a set of sensing conductive elements. Alternatively, all of the conducting elements 301-308 may be sensing elements. The circuitry may also be configured to use the conducting elements 301-308 as shielding elements or masking elements, as is known in the art. The conductive elements 301-308 may be formed using a metallic wire or a conductive track.

The sensing area 309 comprises a first set of conductive elements 301, 303, 305, 307 and a second set of conductive elements 302, 304, 306, 308. Each set of conductive elements comprises a plurality of conductive elements 301-308 in this example but more or less elements may be used. The sensing area 309 is rectangular in this example. A central region 310 of the sensing area 309 is bounded by first, second, third and fourth edge regions 312-318. That is, the edge regions extend along the sides of the sensing area 309. The edge regions 312-318 have a width, in this example, and are shown as regions with point shading in FIG. 3a. Alternatively, an edge region may be considered to be at the very edge and have substantially no thickness. There are no cross-over nodes in this area, and so it cannot be used, as it stands, for mutual capacitance but it may be used for self capacitance touch detection. (Later it will be shown how this region can be used for mutual capacitance touch detection as well.) The edge regions 312, 314, 316, 318 are provided around the central region 310 and surround the central region 310. The second edge region 314 opposes the first edge region 312. The third and fourth edge regions 316, 318 each extend between the first edge region 312 and the second edge region 314. The fourth edge region 318 opposes the third edge region 316. The first and second edge regions 312, 314 extend in a first edge direction 323 and the third and fourth edge regions 316, 318 extend in a third edge direction 324. The third edge direction 324 is orthogonal to the first edge direction 323 in this example.

In the touch sensor 300 of FIG. 3, there is no distinction between x and y elements, each element can be used to determine x and y coordinates. The elements 301-308 all start at the bottom of the sensing area 309, running diagonally up the sensing area 309 in alternate first and second directions 320, 322. In this example, the first direction 320 is perpendicular to the second direction 322. In this way, all of the elements have connectors 330 to external circuitry along a single edge 311 of the sensing area 309.

The conductive elements 301, 303, 305, 307 of the first set each extend through the central region 310 from the first edge region 312 to the second edge region 314 via the third edge region 316. In this example, the conductive elements 301, 303, 305, 307 of the first set each have a first portion 301a, 303a, 305a, 307a that extends in a first direction 320 between the first edge region 312 and the third edge region 316. The first portions 301a, 303a, 305a, 307a may extend through the central region 310. The conductive elements 301, 303, 305, 307 of the first set each change direction within the third edge region 316. Before the change in direction, the conductive elements 301, 303, 305, 307 of the first set are getting closer to, or approaching, the third edge region 316 and after the change in direction the conductive elements 301, 303, 305, 307 of the first set are getting further away from the third edge region 316. After the change in direction, the conductive elements 301, 303, 305, 307 of the first set each have a second portion 301b, 303b, 305b, 307b that extends in a second direction 322 between the third edge region 316 and the second edge region 314. The second portions 301b, 303b, 305b, 307b may extend through the central region 310. The first set of conductive elements 301, 303, 305, 307 passes through the third edge region only once. In this example, the first and second portions of the first and second sets of elements are straight and parallel to other corresponding portions within the same set of elements.

The second set of conductive elements 302, 304, 306, 308 comprises different conductive elements to the first set of conductive elements 301, 303, 305, 307. The second set of conductive elements 302, 304, 306, 308 is interdigitated with the first set of conductive elements 301, 303, 305, 307 at the first edge region 312. In this way, each of the first set of conductive elements 301, 303, 305, 307 has one or two of the second set of conductive elements as its nearest neighbours.

The conductive elements 302, 304, 306, 308 of the second set each extend through the central region 310 from the first edge region 312 to the second edge region 314 via the fourth edge region 318. In this example, the conductive elements 302, 304, 306, 308 of the second set each have a first portion 302a, 304a, 306a, 308a that extends in the second direction 322 between the first edge region 312 and the fourth edge region 318. The first portions 302a, 304a, 306a, 308a may extend through the central region 310. The conductive elements 302, 304, 306, 308 of the second set each change direction within the fourth edge region 318. Before the change in direction, the conductive elements 302, 304, 306, 308 of the second set are getting closer to, or approaching, the fourth edge region 318 and after the change in direction the conductive elements 302, 304, 306, 308 of the second set are getting further away from the fourth edge region 318. After the change in direction, the conductive elements 302, 304, 306, 308 of the second set each have a second portion 302b, 304b, 306b, 308b that extends in the first direction 320 between the fourth edge region 318 and the second edge region 314. The second portions 302b, 304b, 306b, 308b may extend through the central region 310. The second set of conductive elements 302, 304, 306, 308 passes through the fourth edge region only once.

Each of the first and second portions 301a-308a, 301b-308b of the first and second sets of conductive elements 301-308 is diagonal with respect to the first edge direction 323 in which the first or second edge regions 312, 314 extend, and diagonal with respect to a third edge direction 324 in which the third and fourth edge regions 316, 318 extend. In this example, the first portions 301a, 303a, 305a, 307a of the first set of conductive elements 301, 303, 305, 307 extend transverse or obliquely to the first portions of the second set of conductive elements 302, 304, 306, 308. Similarly, the second portions 301b, 303b, 305b, 307b of the first set of conductive elements 301, 303, 305, 307 extend transverse or obliquely to the second portions 302b, 304b, 306b, 308b of the second set of conductive elements 302, 304, 306, 308. The arrangement of the first and second sets of conductive elements 301-308 results in the formation of a matrix of cross over points, which may also be referred to as intersections or nodes of the touch sensor 300. The respective conducting elements 301-308 remain separate, or isolated, from each other at the various nodes. The arrangement of the first and second sets of conductive elements 301-308 is such each conductive element crosses over each of the other conductive elements only once.

The sensing region may be considered to be defined by the bounds of the conductive elements 301-308 of the touch sensor 300. The central portion 310 of the sensing region may be considered to be defined by the bounds of the nodes of the touch sensor 300. That is, the matrix of cross over points may define the central region 310 of the sensing region and the edge regions 312, 314, 316, 318 of the sensing region may form a periphery around the bounds of the matrix of cross over points.

One conductive element, in this example a fourth conductive element 304, is emphasized for clarity, but essentially follows the same rules as, and has a similar layout to, all the other elements. The fourth conductive element 304 runs up the touch sensor 300 diagonally to the left, first crossing its nearest neighbour to the left, a third conductive element 303 at a third-fourth node 326. When the fourth conductive element 304 gets to the left side of the sensing area 309 at the fourth edge region 318, it turns right, and traces a route diagonally up the sensing area 309, eventually crossing its original nearest neighbour to its right, a fifth conductive element 305 at a fourth-fifth node 328, before finishing at the top of the sensing area 309 at the second edge region 314. Throughout this route, the fourth conductive element 304 crosses all of the other elements 301-303, 305-308 just once. The other elements 301-303, 305-308 follow similar routes to the fourth conductive element 304.

With an even number of elements, half of the elements 301-308 start off extending to the right and the other half start off extending to the left. This layout advantageously results in all the elements 301-308 being very similar to each other, in terms of their layout and length, resulting in similar sensitivity to touch.

The presence of a finger adjacent to a node of the touch sensor 300 may be detected by comparing signals from the various conductive elements 301-308. The touch sensor 300 may itself comprise, or be attached to, circuitry that is connected to the conductive elements 301-308 and configured to determine one or more touch positions in the sensing area 309. Such circuitry may be different to that used in touch sensors described previously with reference to FIG. 1 due to the fact that, when used with mutual capacitance techniques, each of the conductive elements, in FIG. 3a, 301-308, may be sensing at some times and controlling at other times, whereas in FIG. 1, half the conductive elements are sensing while the other half are controlling. Routine calibration techniques, may be applied in order to map signals derived from the diagonal positions of touches on the touch sensor 300 with the equivalent position of the nodes on a (vertical/horizontal) matrix. Because each conductive element 301-308 crosses over each of the other conductive elements 301-308 only once, each of the crossover points within the central region 310 of the sensing area 309 is associated with a unique combination of signals from the sensing elements 301-308.

The conductive elements 301-308 of the touch sensor 300 each have two ends: a first end at the first edge region 312 and a second end at the second edge region 314. The conductive elements 301-308 are each configured to be connected to the circuitry at only the first end in this example. The second end of the conductive elements 301-308 does not require termination in this example. Because all the elements 301-308 are connected to a terminal at one end only with no terminal connections on the other three sides, very little "non-sensing" zone 311 is created around the second, third and fourth edge regions 314, 316, 318. This means that a bezel may not be required to hide "feed" wires along the edges of the touch-screen.

The non-sensing zone 311 is the region around the sensing area that comprises "feed" tracks from a connector to the start of the conductive elements within the sensing area. In this case, the touch sensor 300 does not have a non-sensing zone along three of its sides, but does have a non-sensing zone 311 where tracks are led to the connector at the bottom.

If an edge region has a sensing element in it, such as a returning "bent" sensing element, and is being used with self capacitance, then this is a zone that is capable of detecting a finger, even though this may be outside the display zone. However, if a region has no intersecting elements in it, and is being used solely with "mutual capacitance, then this is, in effect, a non-sensing zone, which may also be considered to be an edge region of the sensing area. In FIG. 3a, the non-sensing zone 311 has "feed" tracks in it that are capable of sensing, but are in positions where they would not normally be touched.

Figure 3B:
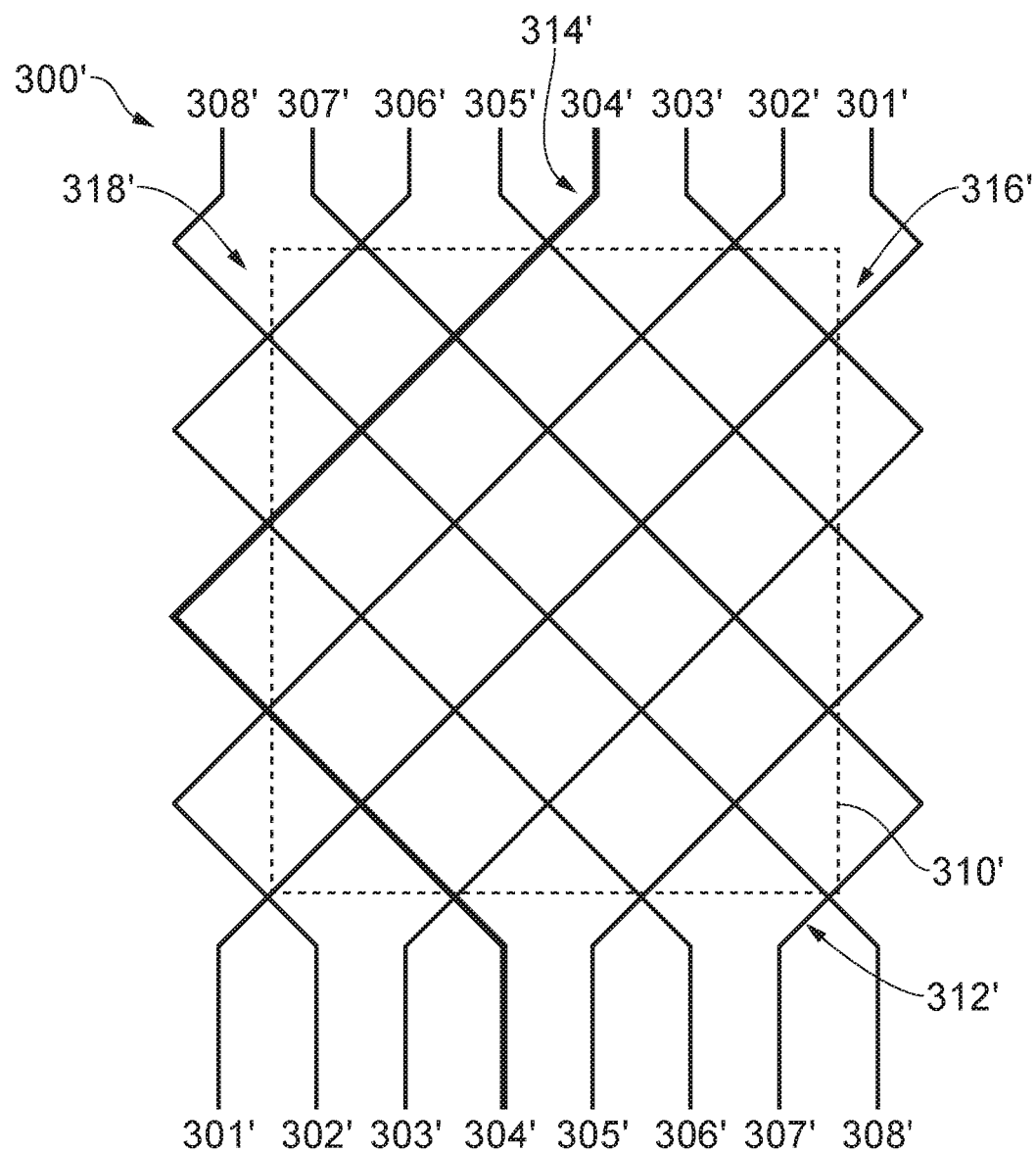
FIGS. 3b and 3d show touch sensors similar to that of FIG. 3a with connection terminals at two ends.

FIG. 3b shows a touch sensor 300' with conductive elements 301'-308' each of which is terminated at two opposite ends of the touch sensor 300'. In this example, the conductive elements 301', 302', 303', 304', 305', 306', 307', and 308', have connection terminals that are configured to be connected to circuitry at the first edge region 312' and the second edge 314'.

In some examples, every element starts at the same edge of the sensing area. Each element is then routed diagonally through the sensing area of the touch-screen until it reaches an edge of the sensing area, which, in most applications, is at right angles to the starting edge. Here it turns back on itself, running back through the same sensing area to the edge of the sensing area that is parallel to, and opposite, the starting edge. Neighbouring elements enter the sensing area from different directions, resulting in about half running in one direction and about half running in the alternative direction.

Figure 3C:
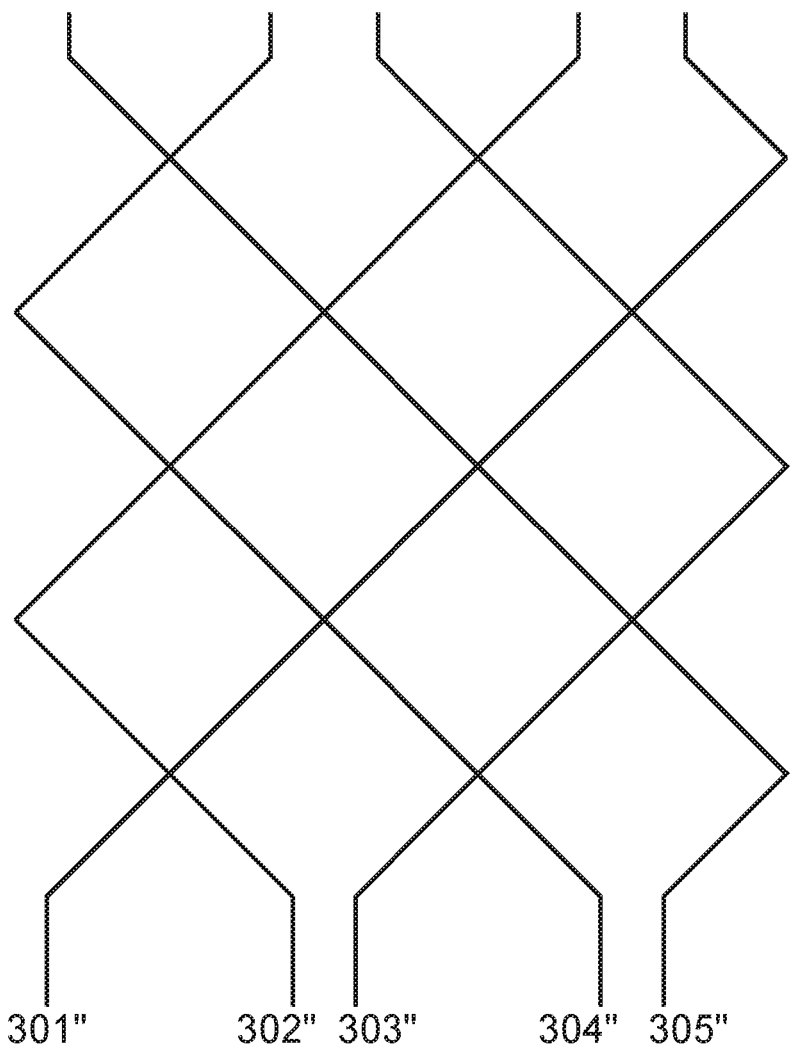
FIG. 3c shows a touch sensor similar to that of FIG. 3a with an odd number of conductive elements.
Figure 3D:
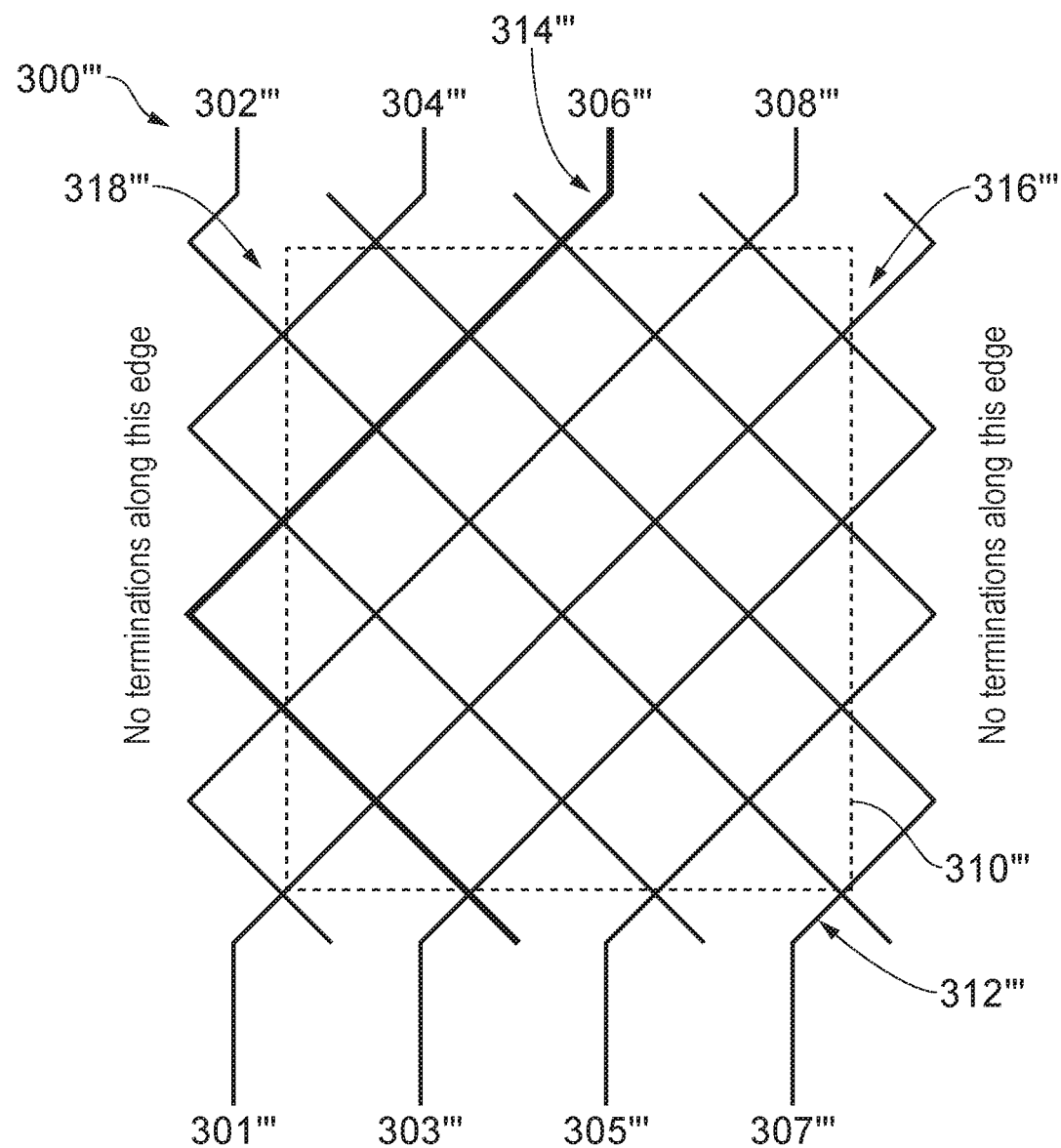

FIG. 3d shows a touch sensor 300''' with conductive elements 301'''-308''' terminated at one of two opposite ends of the touch sensor 300'''. In this example, the first set of conductive elements 301''', 303''', 305''', 307''' have connection terminals that are configured to be connected to circuitry at the first edge region 312''' and the second set of conductive elements 302''', 304''', 306''', 308''' have connection terminals that are configured to be connected to circuitry at the second edge region 314'''. Other permutations are also possible.

In FIGS. 3b and 3d, if a terminal is at the bottom of the display, then, if the first element enters the sensing area running upwards to the left, then its nearest neighbour(s) enter running upwards to the right. If an element starts running upwards to the left, then, after it reaches the left edge of the sensing area and turns back, it will then run upwards to the right, until it reaches the top of the sensing area. If used with a display, these elements may start and finish outside the visual area. They may, also, not bend back on themselves until outside the visual area. That is, the edge regions may be outside a display area which displays information to a user. The first and last, or outermost, elements may not have a "bend" in them, but may simply run diagonally from the bottom edge of the touch-screen to the top edge. In this way, it is possible for every element to cross every other element, within the sensing area, at one unique crossing point for every possible pair of elements. In standard x/y horizontal/vertical touch-screens, x elements only ever cross y elements.

In such arrangements, all elements may be of substantially equal length, and may all terminate along one edge only, with no or only a limited number of "feed" tracks along the edges.

If there are n conductive elements, with no duplicated cross-over nodes, then there will be a maximum of $(n^2-n)/2$ crossing points within the sensing area. When compared to a standard x/y horizontal/vertical system, 100 x/y elements, split evenly as 50x and 50y will provide 2500 intersections. In contrast, a touch sensor such as that described with reference to FIG. 3a provided with 100 diagonal elements can provide 4950 intersections. If cross-over nodes can be duplicated and successfully disambiguated then, for example, 100 diagonal elements can provide 9900 intersections.

In a self capacitance system, these elements are either sensing and/or shielding/neutral elements. In a mutual capacitance system these elements may be sensing (receiving), controlling (transmitting) and/or shielding/neutral elements. These functions may, or may not be fixed for any particular element, and it is possible that, during operation, each element may have one, two, or all three functions.

In self capacitance, it is possible to have all elements as sensing elements at the same time. It is more likely, however, that (only) one element will be selected at a time as a sensing element, while the remaining elements will (temporarily) be selected as shielding or neutral elements. These shielding elements may be connected to "ground" or an active backplane signal (as is known in the art) or left floating.

In "mutual capacitance", depending on the methodology used, it is possible to have one element selected at a time as the driven/controlling/transmitting element, while one, some, or all the other elements are sensing/receiving elements. Alternatively, one or several elements may be selected at a time as the controlling element(s), while one, some or all the other elements are sensing elements. If there are elements that are not being used as sensing or controlling elements, then these may be selected as shielding or neutral elements, or they may be left electrically floating.

Some mutual capacitance methods may not allow more than one element to sense at the same time with a touch sensor similar to that illustrated in FIG. 3a because every element has a unique cross over position with every other element. This is especially likely for a mutual capacitance method in which the sensing signal is the same as, or identical to, the shielding signal. In this situation, the problem may be overcome by slightly restricting the layout, so that each element does not cross every other element.

By having every element crossing all but one, two or three etc. . . . of the other elements, it is possible to sense two, three, or four, etc. . . . inputs at the same time. This modification may be implemented by truncating the touch-screen at the far end (at the second edge region 314) that opposes the element terminal end (at the first edge region 312). Finishing the touch-screen (by halting the laying of wire, for example), one, two, or three, etc. . . . cross-overs before it is completed, will result in every element crossing all but one, two, or three, etc. . . . of the other elements. This may not significantly impair the functioning of the touch-screen. In a large system, the loss of a few rows of cross-overs of elements may be a very small price to pay for the speed advantages gained by being able to sense more than one input at the same time.

FIG. 3c shows a touch sensor 300" similar to that described with reference to FIG. 3a but having an odd number of conductive elements. In this example a first set of conductive elements 301", 303", 305" has an odd number of elements, which may be sensing elements, and a second set of conductive elements 302", 304" has an even number of elements, which may be controllable elements. As such, the touch sensor 300" may provide an odd number of sensing and/or controlling elements.

FIGS. 4 to 13 illustrate various additional features that may be provided in combination with, or as a modification to, the touch sensor described previously with reference to FIG. 3a, for example. In general, similar features between the remaining figures and FIG. 3a will not be discussed further.

Figure 4:
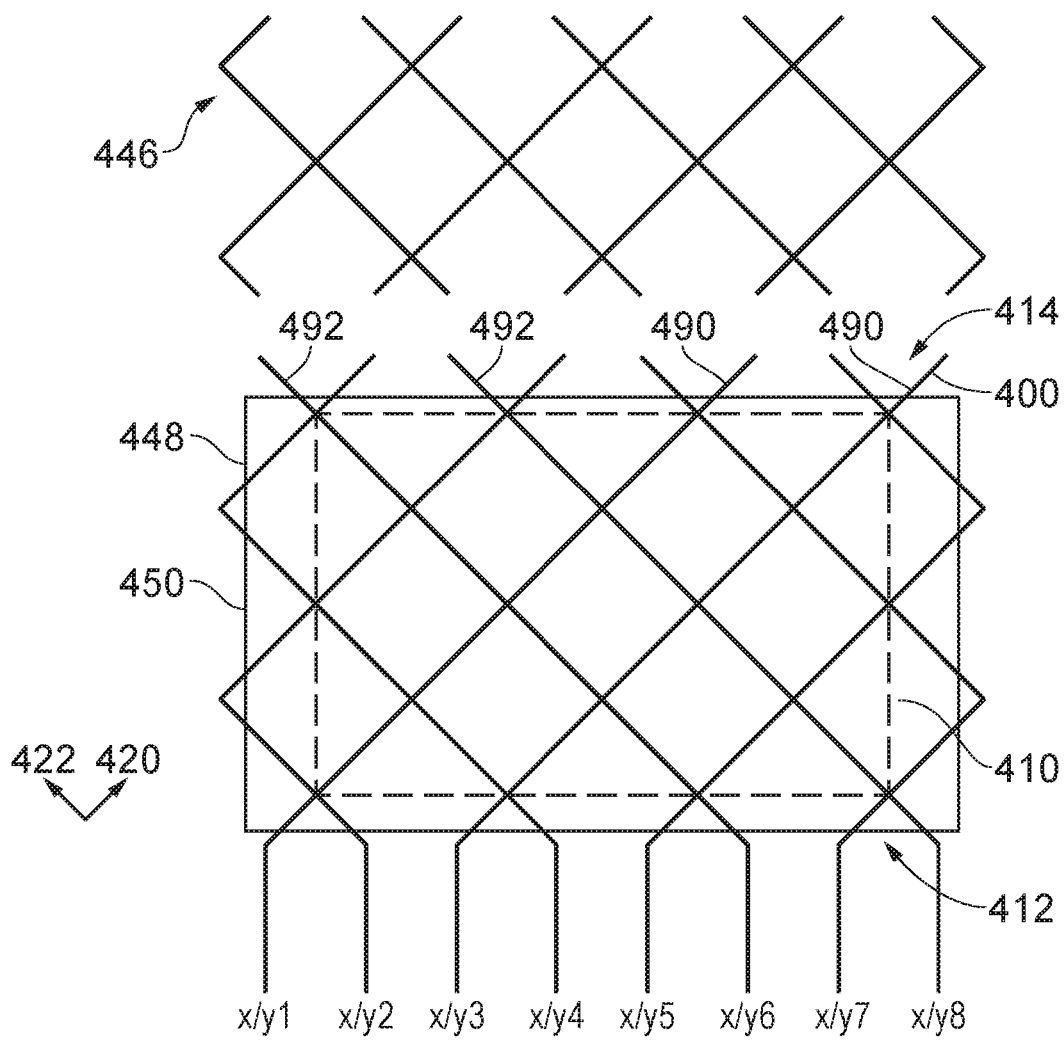
FIG. 4 shows a touch screen comprising a touch sensor and a display.

FIG. 4 shows a touchscreen comprising a display screen 448 and a touch sensor 400 that is similar to that described with reference to FIG. 3a or 3b, but with part of the touch sensor omitted or eliminated in order to accommodate the touch-screen sensing area 410 within the "non-square", or rectangular, display area 450 of the display screen 448, while maintaining an equal distance between all of the crossing-points.

The sensing area of the touch sensor 400 is aligned with edges of the display area 450. In particular, an orientation of the central region 410 of the sensing area may be aligned with respect to edges of the display area 450. The conductive elements are therefore arranged obliquely to the edges of the display area 450.

The display area 450 comprises an array of picture elements (pixels) arranged in columns and rows in this example. The first and second sets of conductive elements of the touch screen extend obliquely to the rows and columns of pixels. The conductive elements of the touch sensor 400 also extend diagonally to edges of the display area 450.

With the elements disposed at 45 degrees to the edges of the display area 450, the sensing area would normally be square. Whereas with a rectangular display such as the display 450 in FIG. 4, the number of elements required is determined by the length of the longer side of the display.

The sensing area has been cropped to fit the shorter side, resulting in an evenly spaced pattern throughout the sensing/display area. This means that a small range of standard widths of touch-screen film can be manufactured, which, when cut down in length can fit a wide range of display sizes. Alternatively, a custom made touch-screen can be manufactured with the top part missing. That is, a top part 446 of the touch sensor may be either cut off or not manufactured at all. By cutting down the film before each of the conductive elements has a chance to cross every other conductive element, some conductive elements will not reach as far as the third or fourth edges and so, will not have a change in direction within the sensing area. In addition to the first and second set of sensing elements previously described with reference to FIG. 3a, the touch sensor 400 comprises a third set of sensing elements 490, 492 that extends directly between the first and second regions edges 412, 414 of the touch sensor 400.

The touch sensor 400 in this example has diagonal elements having two manifestations:
1) without any bends within the sensing area (the third set of conductive elements)
2) with a bend within the sensing area (the first and second sets of conductive elements).

The third set of sensing elements 490, 492 is provided as a consequence of, or in order to compensate for, the cropping of the touch sensor 400. The first, second and third sets of sensing elements together form a matrix of nodes with a similar appearance to that described with reference to FIG. 3a. The third set of sensing elements has a first subset 490 and the second subset 492. The first subset 490 extends in the first direction 420 and the second subset 492 extends in the second direction 422. Each of the third set of conductive elements 490, 492 intersects with each of the first and second set of conductive elements only once. Each of the first subset of the third set of conductive elements intersects with each of the second subset of the third set of conductive elements only once.

Figure 5A:
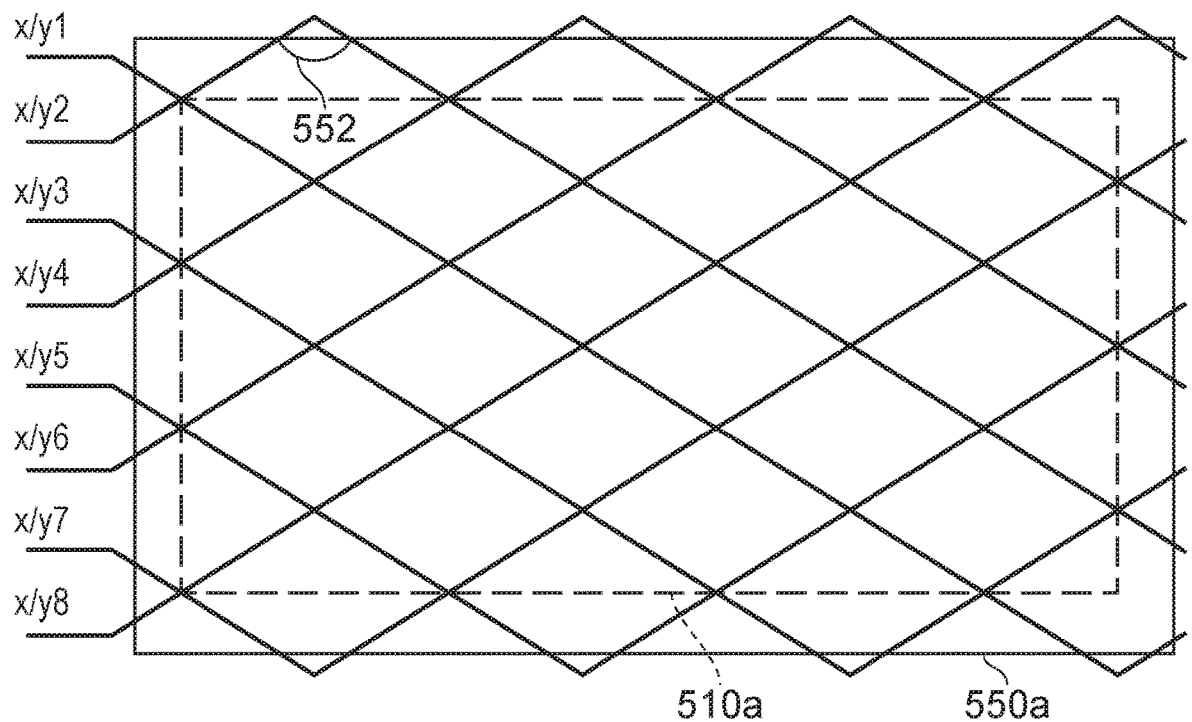
FIGS. 5a and 5b shows a touch sensor with compressed and stretched arrangements of conductive elements.
Figure 5B:
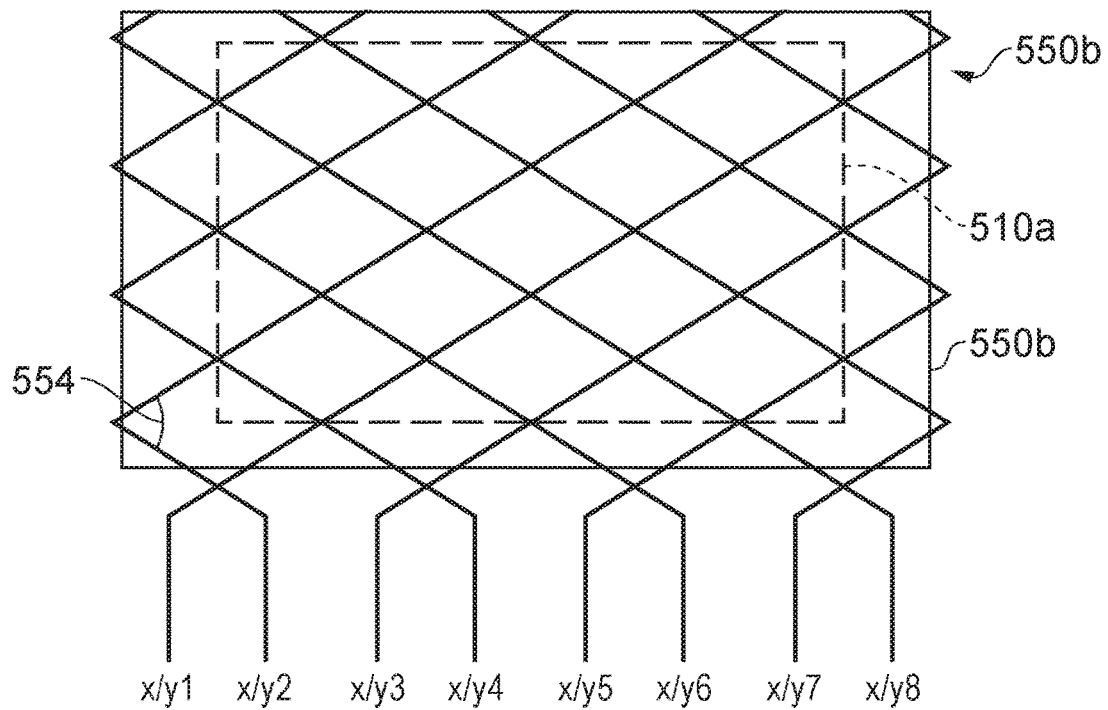

FIGS. 5a and 5b show touch screens in which a dimension of the sensing area has been stretched, or compressed, in order to fit the display area. Both of these arrangements alter the relative spacing between the cross-over points compared to the touch sensors described with reference to FIGS. 3 and 4 and also changed the diagonal angle of the elements from 45° relative to the edges of the sensing area or display area.

In FIG. 5a, an angle 552 between first and second portions of each of the elements (as discussed above with reference to FIG. 3a) is increased to be an obtuse angle, thereby stretching the sensing area (and its central region 510a) so that it fits the display area 550a. In this example, termination of the elements is at the side of the display 550a.

In FIG. 5b, an angle 554 between first and second portions of each of the elements is decreased to be an acute angle, thereby compressing the sensing area (and its central region 510b) so that it fits the display area 550b. In this example, termination is at the bottom of the display 550b.

Figure 6:
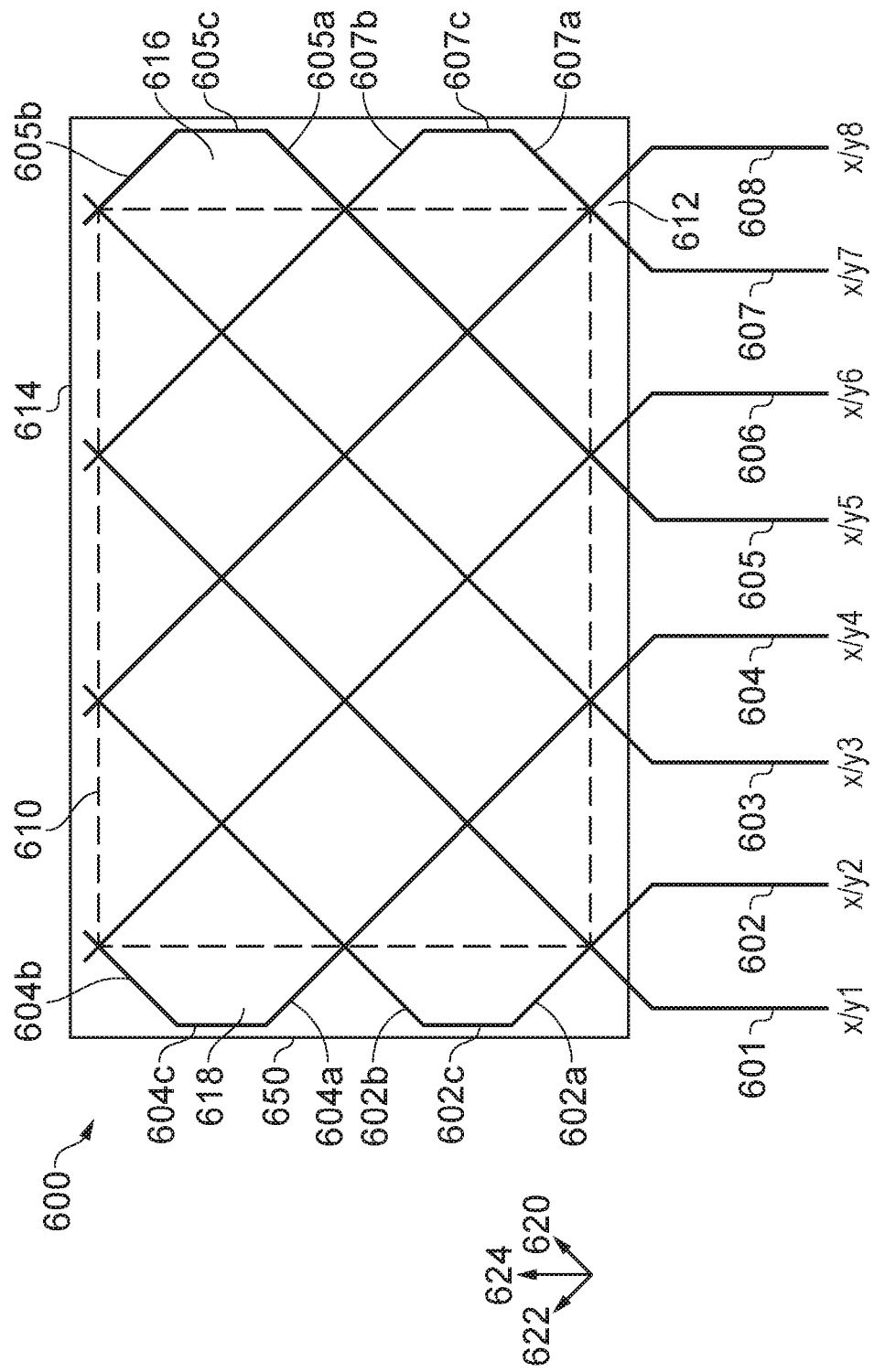
FIG. 6 shows a touch screen similar to that of FIG. 3a with modified conductive elements.

FIG. 6 shows a touch screen 600 which is similar to the touch screen described previously with reference to FIG. 4 except that conductive elements have been distorted at the edge regions of the sensing area in order to reduce even further, the already very narrow width of the "non-sensing" zone down the sides of the touch-screen.

In this example, the touch sensor comprises 8 sensing elements that are provided in a row along the first edge 612 of the sensing area. A first set of conductive elements comprises a fifth conductive element 605 and a seventh conductive element 607. A second set of conductive elements comprises a second conductive element 602 and a fourth conductive element 604. A third set of conductive elements comprises a first subset having a first conductive element 601 and a third conductive element 603, and a second subset having a sixth conductive element 606 and an eighth conductive element 608. The third set of conductive elements is generally as described previously with regard to FIG. 4.

The conductive elements 605, 607 of the first set each extend through the central region 610 from the first edge region 612 to the second edge region 614 via the third edge region 616. In this example, the conductive elements 605, 607 of the first set each have a first portion 605a, 607a that extends in the first direction 620 between the first edge region 612 and the third edge region 616. The conductive elements 605, 607 of the first set each have a first change in direction within the third edge region 616. Before the first change in direction, the conductive elements 605, 607 of the first set are getting closer to, or approaching, the third edge region 616. After the first change in direction, the conductive elements 605, 607 of the first set each have an intermediate portion 605c, 607c that extends in the third edge direction 624 along the third edge region 616. The first portion 605a, 607a of each of the conductive elements 605, 607 of the first set is directly connected to the intermediate portion 605c, 607c of the respective conductive elements of the first set. After extending along the third edge region 616, the conductive elements 605, 607 of the first set each have a second change in direction within the third edge region 616. After the second change in direction the conductive elements 605, 607 each have a second portion 605b, 607b that extends in the second direction 622 between the third edge region 616 and the second edge region 612. The intermediate portion 605c, 607c of each of the conductive elements of the first set is directly connected to the intermediate portion 605c, 607c of the respective conductive elements of the first set. The first set of conductive elements 605, 607 passes through the third edge region only once.

The conductive elements 602, 604 of the second set each extend through the central region 610 from the first edge region 612 to the second edge region 614 via the fourth edge region 618. In this example, the conductive elements 602, 604 of the second set each have a first portion 602a, 604a that extends in the second direction 622 between the first edge region 612 and the fourth edge region 618. The conductive elements 602, 604 of the second set each have a first change in direction within the fourth edge region 618. Before the first change in direction, the conductive elements 602, 604 of the second set are getting closer to, or approaching, the fourth edge region 618. After the first change in direction, the conductive elements 602, 604 of the second set each have an intermediate portion 602c, 604c that extends in the third edge direction 624 along the fourth edge region 618. The first portion 602a, 604a of each of the conductive elements 602, 604 of the second set is directly connected to the intermediate portion 602c, 604c of the respective conductive elements of the second set. After extending along the fourth edge region 618, the conductive elements 602, 604 of the second set each have a second change in direction within the fourth edge region 618. After the second change in direction the conductive elements 602, 604 each have a second portion 602b, 604b that extends in a second direction 620 between the fourth edge region 618 and the second edge region 614. The intermediate portion 602c, 604c of each of the conductive elements of the second set is directly connected to the intermediate portion 602c, 604c of the respective conductive elements of the second set. The second set of conductive elements 602, 604 passes through the fourth edge region only once.

Figure 7A:
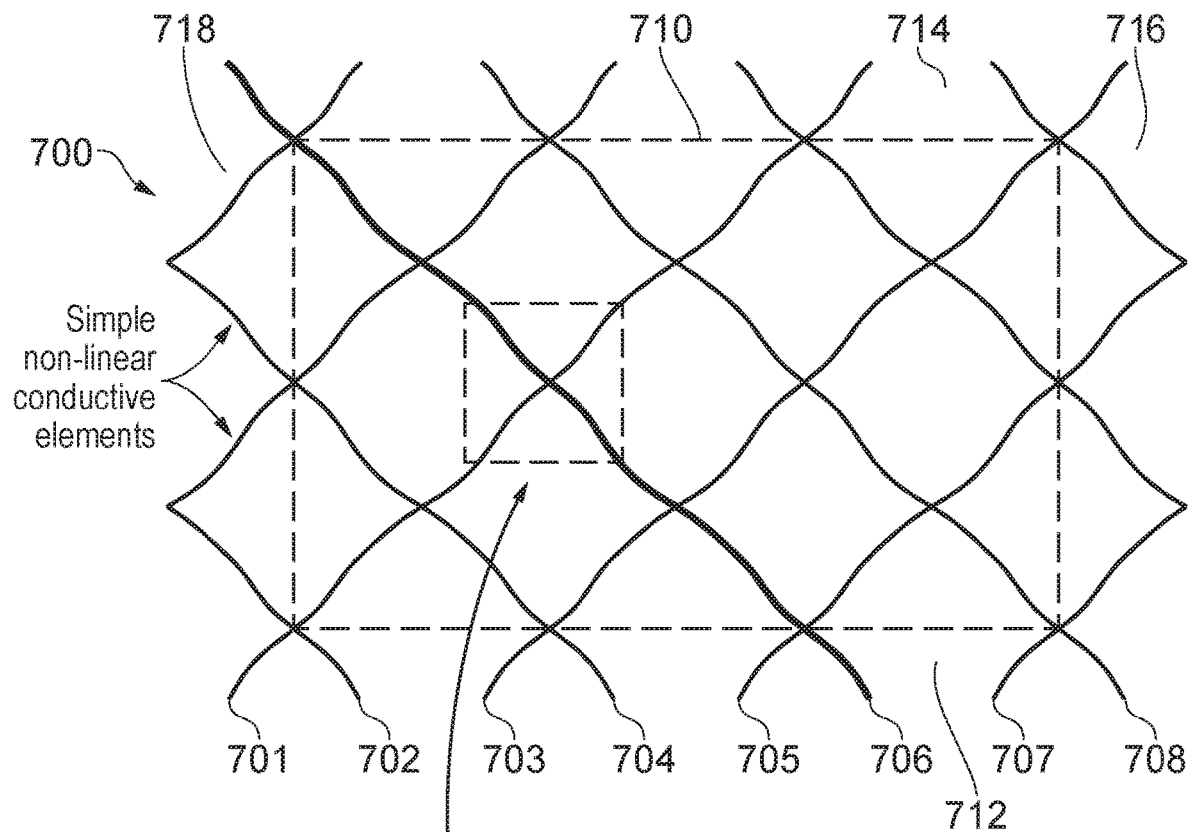
FIG. 7a shows an array of non-linear conductive elements.

FIG. 7a illustrates a touch sensor 700 comprising non-linear wire conductive elements 701-708. One reason the wires are made "non-linear" is to break-up any reflections and so reduce the visibility of the wire compared to the case where the wire is straight. A sixth conductive element 706 has been emphasised for clarity, but is otherwise similar to other conductive elements 701-707, 708.

The touch sensor 700 has a first set of wire elements 705, 707 and a second set of wire elements 702, 704 similar to the sets of conductive elements described with reference to FIGS. 4 to 5. The conductive elements 705, 707 of the first set each have a non-linear portion between the third edge region 716 and the first or second edge regions 712, 714. The conductive elements 702, 704 of the second set each have a non-linear portion between the fourth edge region 718 and the first or second edge regions 712, 714. The first and second sets of conductive elements each have a first and second portion as described previously. The first and second portions of the first and second sets of conductive elements each comprise a non-linear portion. The non-linear portion may be provided by a curved or wavy line, or a zig-zag pattern, for example.

A small amount of regular non-linearity is shown in FIG. 7a. In other examples, the non-linearity can be irregular, increased in amplitude, or alternatively patterned in a way that, not only reduces reflectivity, but also increases capacitive coupling between crossing wire elements.

Figure 7B:
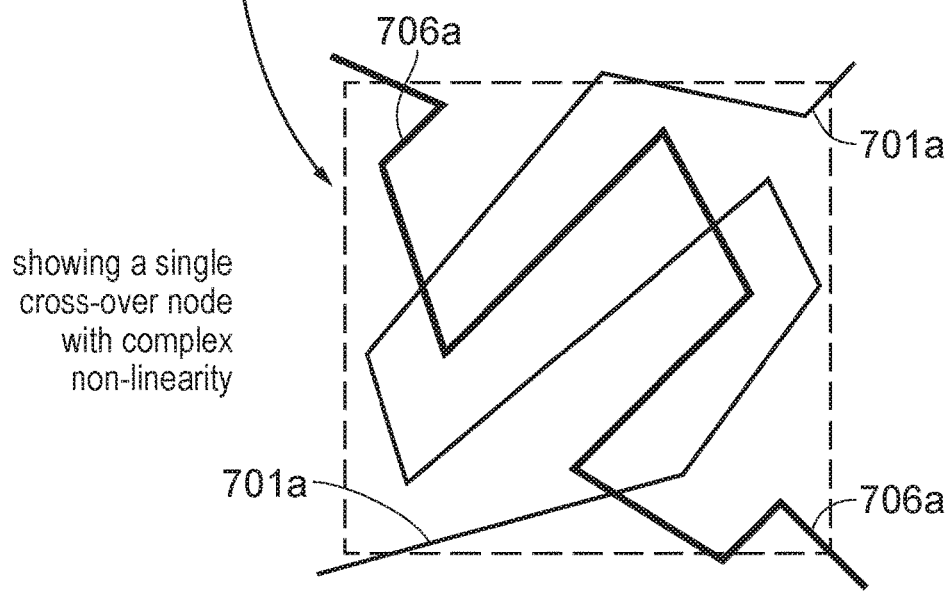
FIG. 7b shows a single complex cross-over node.

FIG. 7b illustrates an expanded view of one possible example of a node between two conductive elements, such as the node between the sixth conductive element 706 and the first conductive element 701 of FIG. 7a. The node is an example of a complex cross-over node. In FIG. 7a, a first conductive element 701a is interdigitated with a second conductive element 706a. The second conductive element 706a is superimposed on the first conductive element 701a. The first conductive element 701a has a jagged 'S' shape. The second conductive element 706a has a jagged 'W' shape. The arrangement of the first and second conductive elements 701a, 706a results in a significant increase in the lengths of each element that are proximal to each other, thereby increasing the capacitive coupling between the conductive elements 701a, 706a. This improves touch sensitivity in mutual capacitance systems. In this example, conductive element 701a crosses conductive element 706a three times within a single "cross-over" node Wide non-linear patterns in the wire elements can increase the effective width of sensitivity around each of the wires, and thereby also increase the sensitivity of the touch sensor 700. It may be desirable for some applications to arrange the wires with respect to the display such that the wires do not form angles with the display picture elements that cause Moire interference.

Introducing a small amount of zig-zagging, or "non-linearity" into the wire elements has the added advantage that it allows the supporting medium to be distorted or even creased without damaging the wires. The wires can move within the supporting medium, straightening and stretching a bit without breaking. This stretching and/or straightening is particularly advantageous if the supporting medium is vacuum formed into a complex shape, or if the supporting medium is elastic and needs to be stretched on occasions.

Figure 8:
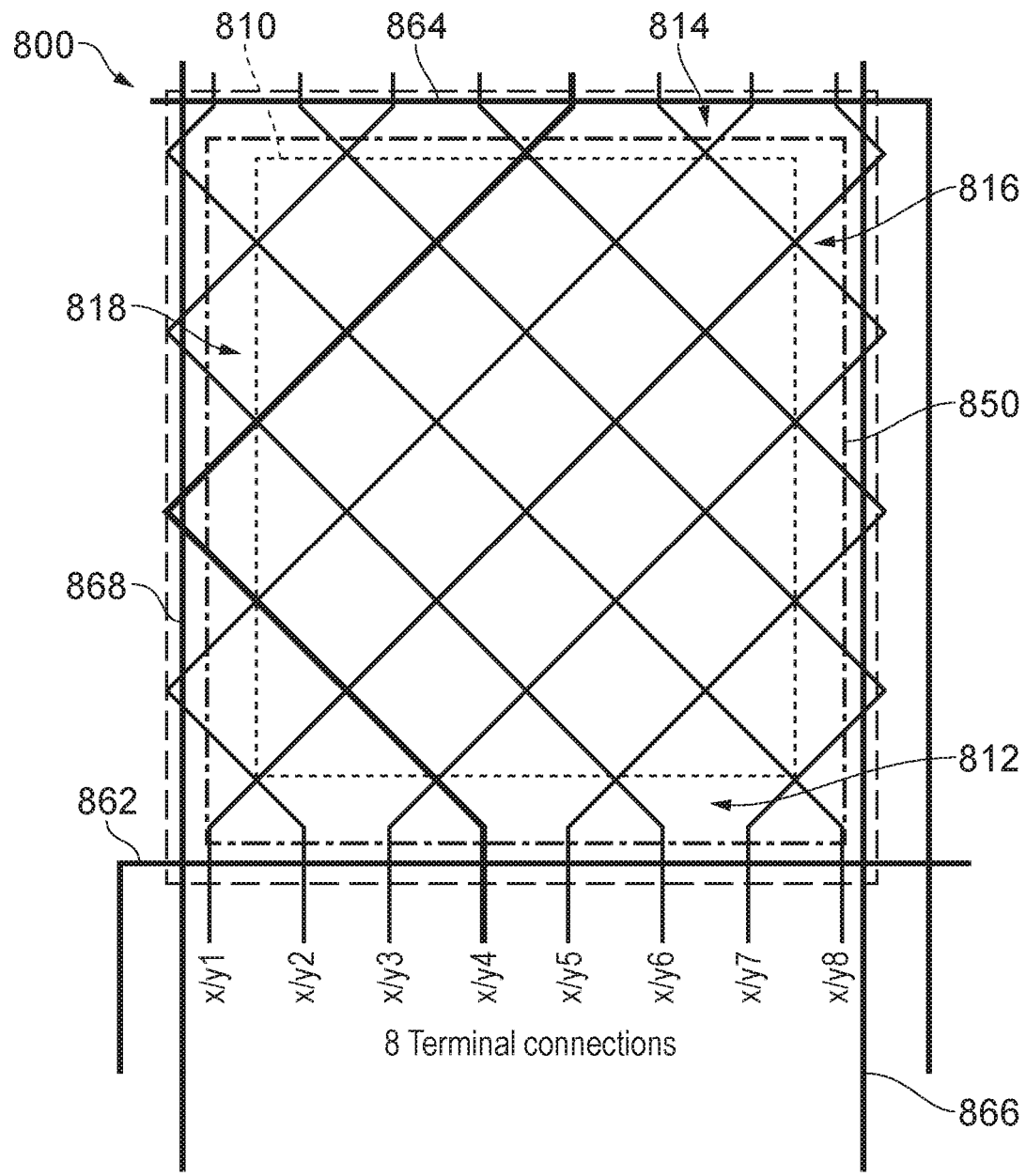
FIG. 8 shows a touch sensor similar to that of FIG. 3a with a set of conductive elements arranged at edges of the sensing region.
Figure 17A:
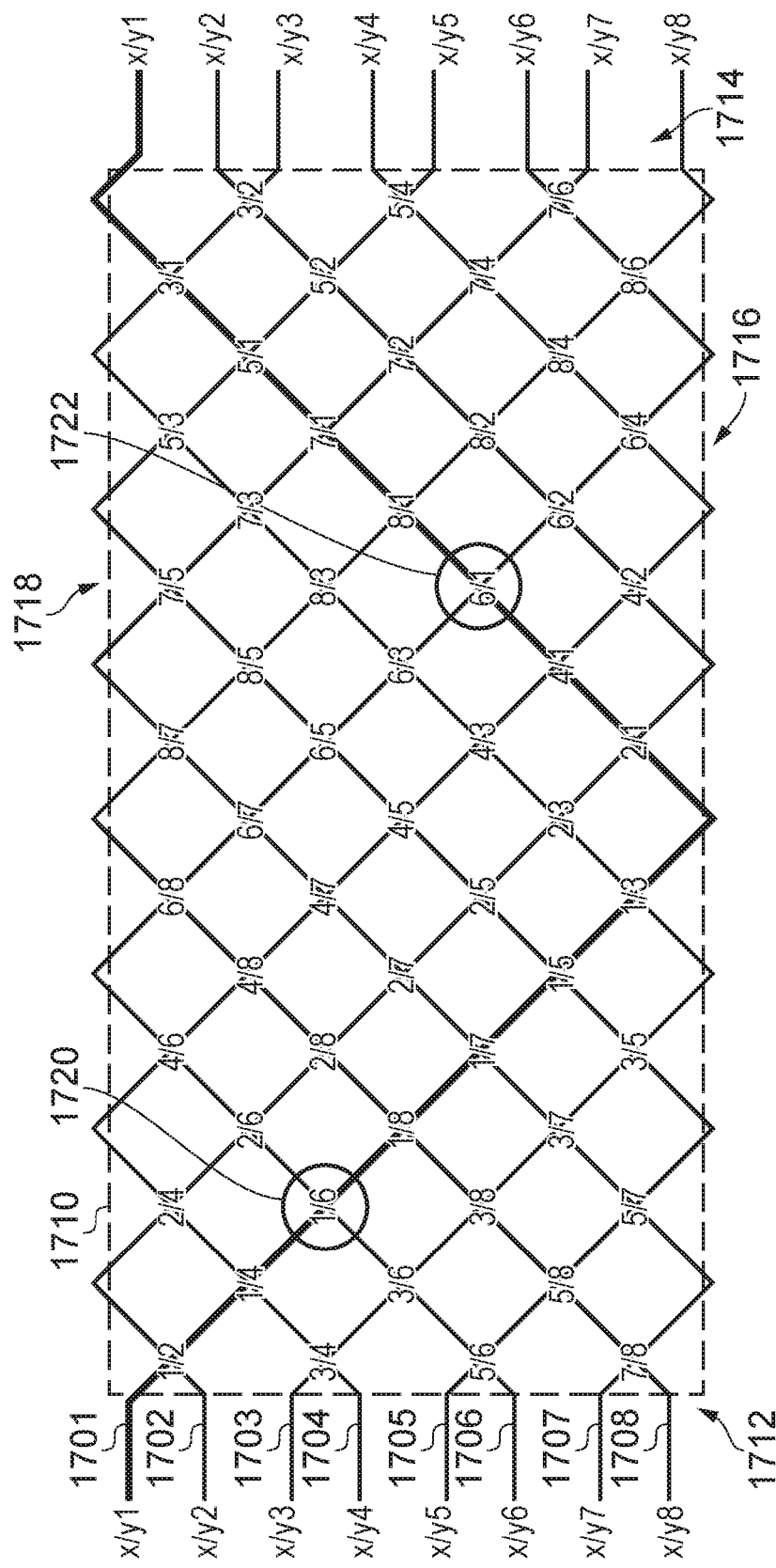
FIG. 17a shows a touch sensor with 8 conductive elements forming 56 nodes in a sensing region.

FIG. 8 shows a touch sensor 800 similar to that described with reference to FIG. 3 further comprising a fourth set of conductive elements. The fourth set of conductive elements comprises first, second, third and fourth extra elements 862, 864, 866, 868 provided at the edges of the sensing area within, and extending along, the respective first, second, third and fourth edge regions 812, 814, 816, 818. Each conductive element 862, 864, 866, 868 of the fourth set is provided within and extends along a respective edge region 812, 814, 816, 818. The fourth set of conductive elements has the effect of increasing the number of sensing points along the edge regions 812, 814, 816, 818. The fourth set of conductive elements may comprise wire elements. Additional sensing positions are provided at nodes where the fourth set of conductive elements 862, 864, 866, 868 cross the first or second set of conductive elements within the edge regions 812, 814, 816, 818. Because the third and fourth conductive elements 866 and 868 only ever intersect different elements to each other, they may be joined together as a single element. If the sensor was extended, as shown in FIG. 17a, forming duplicate cross-over nodes, then elements 866 and 868 would each intersect all of the conductive elements, and so would have to remain as separate elements.

If mutual capacitance sensing is required right up to the edge of the sensing area then conductive elements 866 and 868 may be required to enable this.

The fourth set of conductive elements 862, 864, 866, 868 may be positioned within, or slightly outside a display area 850 in the case where the touch sensor 800 is part of a touch screen. If the fourth set of conductive elements is within the display area 850 then the conductive elements may be made "non-linear" in order to reduce their visibility. The fourth set of conductive elements, as well as the first and second sets of conductive elements, may alternatively follow a convoluted/non-linear route in order to move sensing points to more advantageous positions, where a higher concentration of sensing points is required, or, such as the position of soft keys for the display, for example. An alternative arrangement for the fourth set of conductive elements is described below with reference to FIG. 13.

As well as running along the third and fourth edges of the touch sensor, many similar conductive elements to the third and fourth extra elements 866, 868 may be regularly spaced across the sensing area, running from the first edge to the second edge, parallel to the third and fourth extra elements 866, 868, and forming multiple cross-over "nodes" within the sensing area, each node having three intersecting conductive elements within it. An example of a node with three intersecting elements in it is shown in FIG. 13, below. Such "complex nodes" may be used to help disambiguate duplicate nodes in extended touch sensors. This method is particularly suited to wire based touch sensors.

Figure 9:
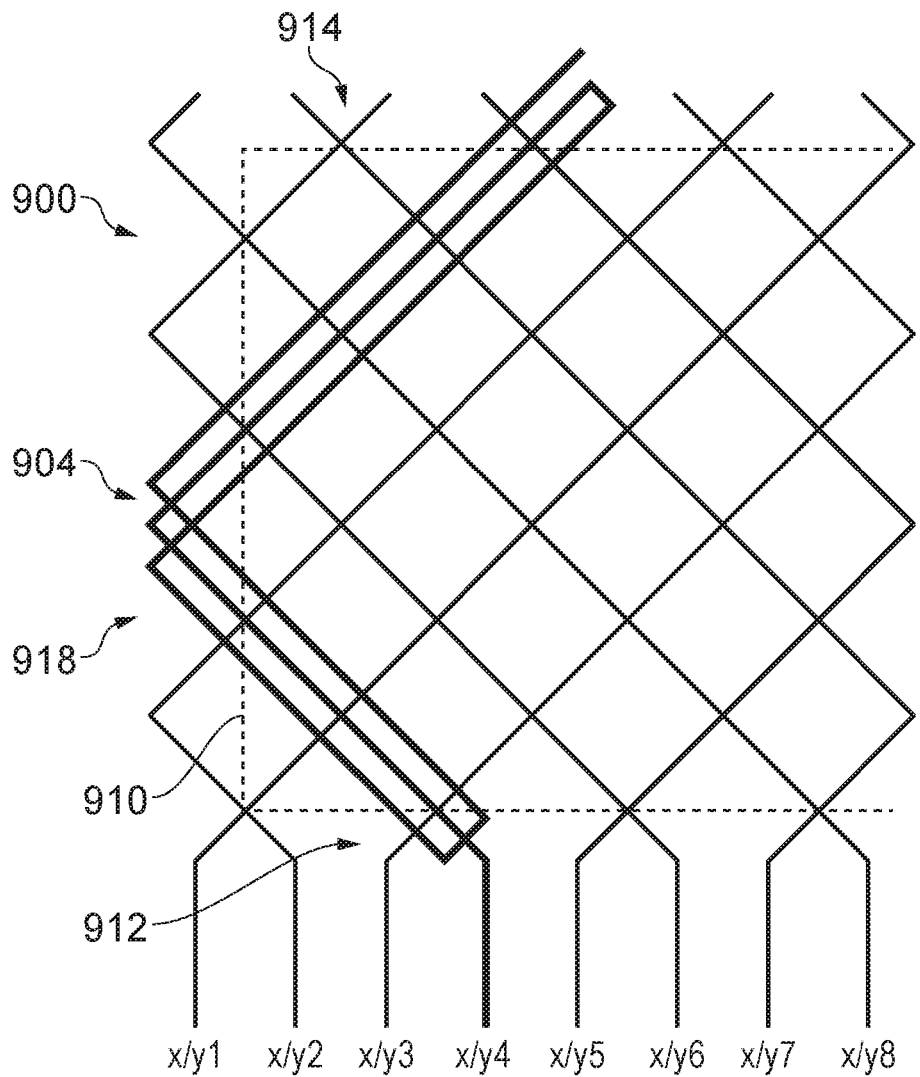
FIG. 9 shows a touch sensor with a conductive element having an enlarged effective width.

FIG. 9 shows a touch sensor 900 similar to that described with reference to FIG. 3 in which a wire element 904 is folded back on itself in order to increase the sensing or controlling area covered by the folded back wire element 904. Only one folded back wire element 904 is shown, for clarity, but the same arrangement could apply to all the elements. The folded back wire element 904 may follow a stretched out spiral pattern or simple serpentine pattern. The stretched out spiral pattern has the effect of mitigating a slight variation in sensitivity of the wire element along its length due to the resistance of the wire. The wire element 904 extends continuously:

i) from the first edge region 912 to the fourth edge region 918, where it changes direction;
ii) from the fourth edge region 918 to the second edge region 914, where it loops back;
iii) from the second edge region 914 to the fourth edge region 918, where it passes over its earlier path and changes direction;
iv) from the fourth edge region 918 to the first edge region 912, where it loops back and passes over its earlier path;
v) from the first edge region 912 to the fourth edge region 918, where it passes over its earlier paths and changes direction; and
vi) from the fourth edge region 918 to the second edge region 914.

In some examples, the wire element 904 may terminate at the first region such that it stops after (iv) above.

Alternatively, the folded back wire element 904 could follow an elongated zig-zag pattern. Such an arrangement may be acceptable in smaller touch-screens, such as those that are less than 2 metres wide. It may also be preferable for some applications to provide the folded back wire elements with "non-linearity" as described above with reference to FIG. 7a.

Figure 10:
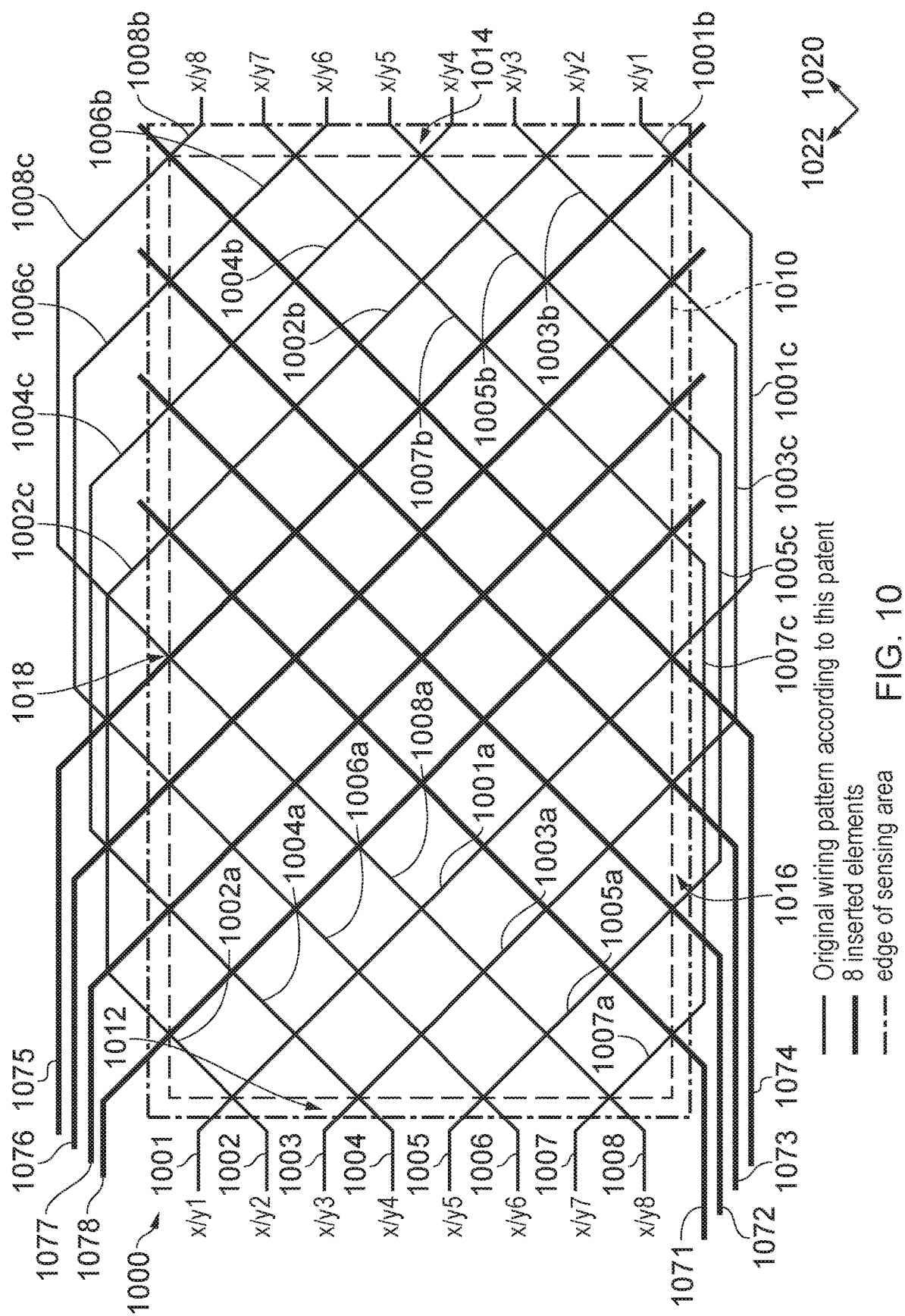
FIG. 10 shows a touch sensor similar to that of FIG. 3a comprising a further set of conductive elements arranged in the sensing area.

FIG. 10 shows a touch sensor 1000 that is generally similar to that described previously with reference to FIG. 6. As discussed above with regard to FIG. 6, each of the conductive elements 1001-1008 of the first and second sets has a first portion 1001a-1008a, an intermediate portion 1001c-1008c and a second portion 1001b-1008b. In this example, the first and second portions 1001a-1008 a, 1001b-1008b of the first and second sets of conductive elements 1001-1008 are stretched apart by the respective intermediate portions 1001c-1008c of the first and second sets of conductive elements such that a space is formed in the middle of the touch sensor 1000. A third set of conductive elements 1071-1078 has been inserted into the grid pattern formed by the first and second sets of conductive elements 1001-1008.

The third set of conductive elements 1071-1078 extends between the third edge region 1016 and the fourth edge region 1018. The third set of conductive elements 1071-1078 extends diagonally across the central region 1010 between the third edge region 1016 and the fourth edge region 1018. Each of the first subset of the third set of conductive elements 1071-1074 extends in the first direction 1020 within the central region 1010.

The third set of conductive elements 1071-1078 has a first subset of conductive elements. The first subset of the third set of conductive elements 1071-1074 at the third edge region 1016 is closer to the first edge region 1012 than the second edge region 1014. The first subset of the third set of conductive elements 1071-1074 at the fourth edge region 1016 is closer to the second edge region 1014 than the first edge region 1012. Feed tracks are provided along the third edge region 1016 to connect the first subset of the third set of conductive elements 1071-1074 to circuitry. Terminals for the first subset of the third set of conductive elements 1071-1074 may be provided at the first edge region 1012. As discussed with reference to FIG. 6, the first portions 1002a, 1004a, 1006a, 1008a of the second set of conductive elements 1002, 1004, 1006, 1008 and the second portions 1001b, 1003b, 1005b, 1007b of the first set of conductive elements 1001, 1003, 1005, 1007 also extend in the first direction 1020 within the central region 1010 and so are parallel, in the central region 1010, with the first subset of conductive elements 1071-1074 of the third set.

The third set of conductive elements 1071-1078 also has a second subset of conductive elements 1075-1078. The second subset of the third set of conductive elements 1075-1078 at the fourth edge region 1018 is closer to the first edge region 1012 than the second edge region 1014. The second subset of the third set of conductive elements 1075-1078 at the third edge region 1016 is closer to the second edge region 1014 than the first edge region 1012. Each of the second subset of the third set of conductive elements 1075-1078 extends in the second direction 1022 within the central region 1010. Feed tracks are provided along the fourth edge region 1018 to connect the second subset of the third set of conductive elements 1075-1078 to circuitry. Terminals for the second subset of the third set of conductive elements 1075-1078 may be provided at the first edge region 1012. As discussed with reference to FIG. 6, the first portions 1001a, 1003a, 1005a, 1007a of the first set of conductive elements 1001, 1003, 1005, 1007 and the second portions 1002b, 1004b, 1006b, 1008b of the second set of conductive elements 1002, 1004, 1006, 1008 also extend in the second direction 1022 within the central region 1010 and so are parallel, in the central region 1010, with the second subset 1075-1078 of the third set of conductive elements.

The touch sensor 1000 in this example includes some "feed" tracks along the sides of the sensing area in order to connect the third set of conductive elements 1071-1078 to either the first edge region 1012 or the second edge region 1014 for connecting to circuitry. Other wire arrangements can also be used as an alternative to the arrangement of the fourth set of conductive elements 1071-1078 shown in FIG. 10.

Figure 11:
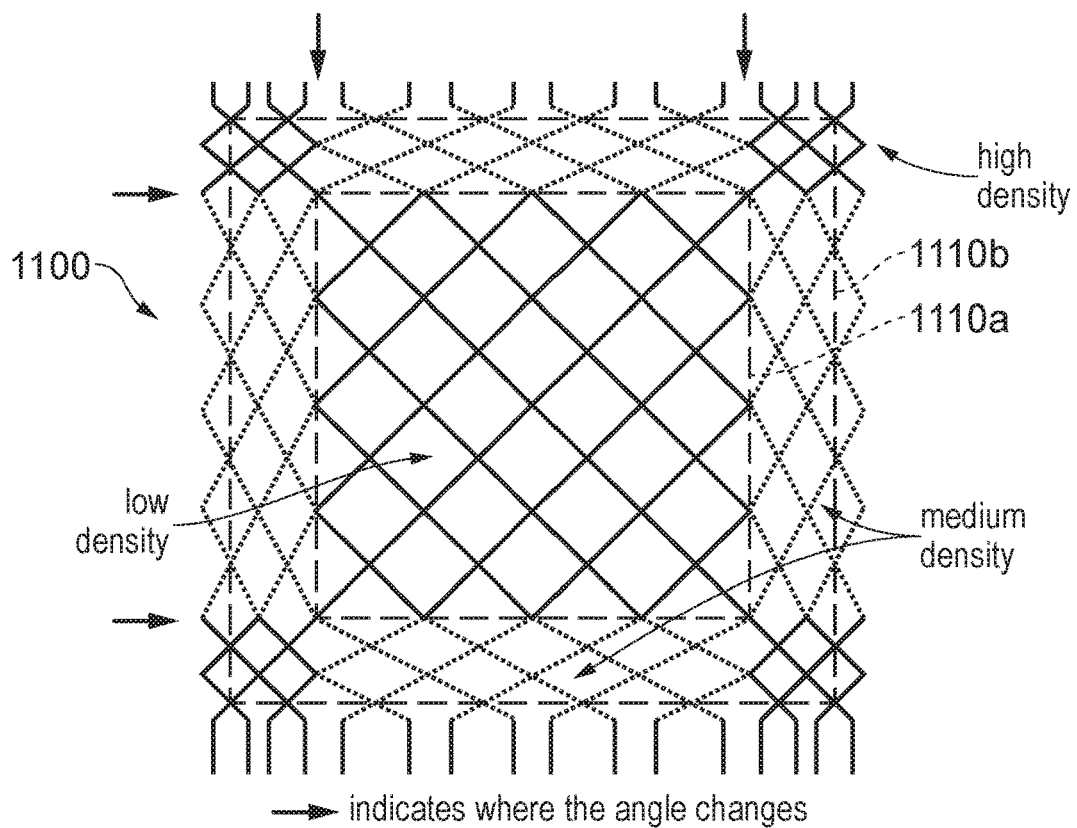
FIG. 11 shows a touch sensor in which angles between the conductive elements are varied in order to locally change a node density within the sensing area.

FIG. 11 shows a touch sensor 1100 having conductive elements that change angle as they run through the touch-screen in order to alter the concentration of sensing points in portions of the touch-screen. Such changes in angle are examples of non-linearity.

Each of the conductive elements has a first portion and a second portion as described previously with reference to FIG. 3. In this example, one or both of the first and second portions comprise a plurality of sub-portions. Each sub portion is straight in this example and forms an obtuse angle with another sub-portion of the same portion such that the touch sensor has a low density region of nodes in an inner central region 1110a, a medium density of nodes in an outer central region 1110b and a high density of nodes at corners of the sensing area.

FIG. 11 provides one example of how sensing points can be compressed along the edges and in the corners of the touch sensor, allowing higher resolution in these areas to be achieved. This spatial resolution can be very useful for Microsoft® Windows™ applications, for example, in which very small items in the corners and along the edges may have to be selected by a user.

Although FIG. 11 shows regular equal "compression" along all four sides of the touch sensor 1100, this is not essential, and compression could instead be irregular, and/or occur only along one, two or three sides, or anywhere within the touch-screen.

Figure 12:
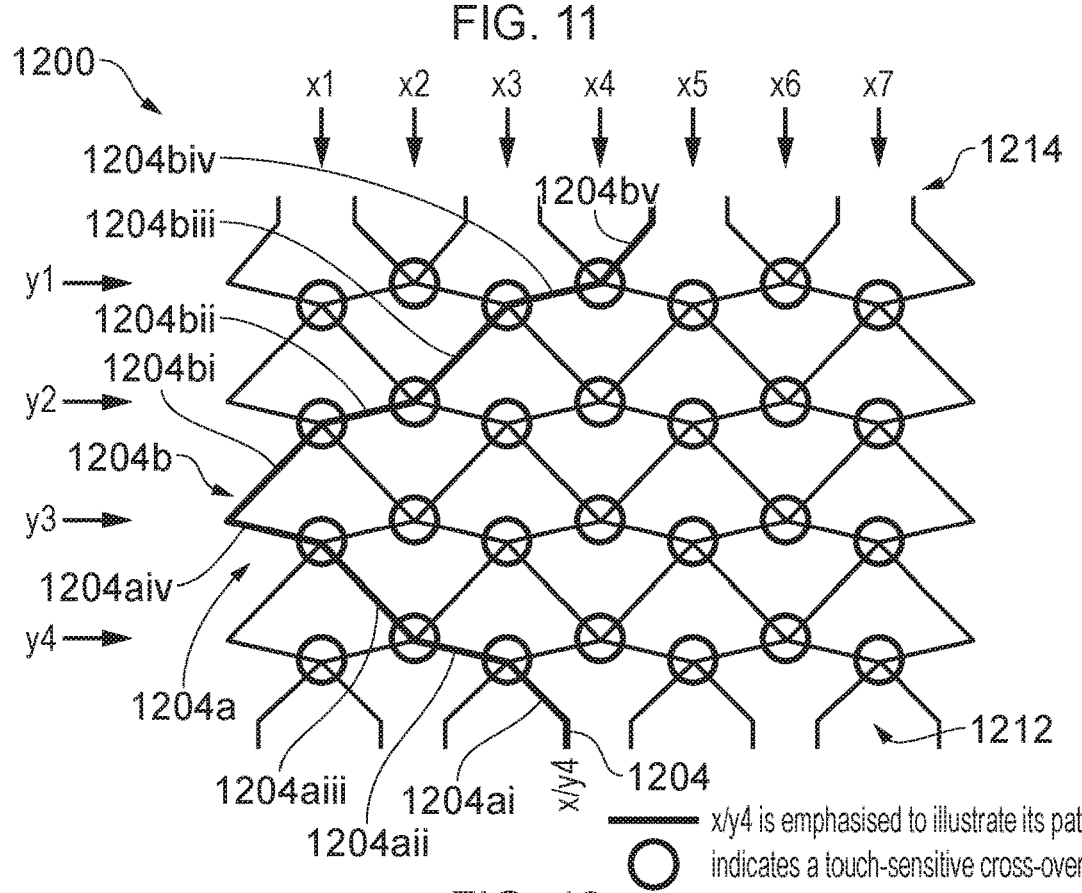
FIG. 12 shows a touch sensor similar to that of FIG. 3a in which angles of the conductive elements vary along their length.

FIG. 12 shows a touch sensor 1200 having conductive elements that change angle throughout the touch-screen, making the touch-sensing cross-over points appear to be on a more or less regular grid.

In this example, one or both of the first and second portions comprise a plurality of sub-portions. Each sub portion is straight and forms an obtuse or reflex angle with neighbouring sub-portions of the same portion. A fourth conductive element 1204 is highlighted in the example in FIG. 12. The fourth conductive element 1204 has a first portion 1204a and a second portion 1204b that is directly connected to the first portion 1204a. Each of the first and second portions 1204a,b has first, second, third and fourth sub-portions. Each second sub-portion 1204aii, 1204bii is connected to a respective first sub-portion 1204ai, 1204bi at an obtuse angle that faces the first edge region 1212 and is connected to a respective third sub-portion 1204aiii, 1204biii at an obtuse angle that faces the second edge region 1214. Each third sub-portion 1204aiii, 1204biii is also connected to a respective fourth sub-portion 1204aiv, 1204biv at an obtuse angle that faces the first edge region 1212. The second portion 1204b of the fourth conductive element 1204 also has a fifth sub-portion 1204bv that is connected to the respective fourth sub-portion 1204biv by an obtuse angle that faces the second edge region 1214.

The equivalent x and y matrix x1-7, y1-4 is also indicated in FIG. 12. This diagram shows how the equivalent of a 7×4 matrix is produced from just 8 conductive elements. Such an arrangement of conductive elements may enable a controller, which may be implemented in software, to assume that nodes in the touch sensor 1100 are on a regular x/y grid. As such, standard software for the analysis of touch positions can be used with the touch sensor 1100. Assuming that the nodes are disposed on an x/y grid may introduce a small amount of spatial error, but this error may be acceptable, correctable or compensated for by the controller in some applications.

FIG. 13a shows a touch sensor 1300a comprising a fourth set of conductive elements e1-e6 similar to that described above with reference to FIG. 8. In this example, the conductive elements e1-e6 are routed from the edge regions into the diagonal matrix of conductive elements within the central region 1310a of the sensing area in order to provide extra sensing capability along the edges of the sensing area.

Some mutual capacitance methods may not allow every combination of cross-over points to be used. Immediately neighbouring conductive elements, running parallel to each other over long distances through the sensing region, may have significantly strong "parasitic" capacitive coupling to each other that the capacitive coupling at the "node" where they cross over each other is swamped by this "parasitic" capacitance. In consequence, "nodes" along the edges of the touch sensor may not be usable in the normal way.

To overcome this, these extra conductive elements e2, e3, e5 and e6 may be used instead, eliminating the need to measure the capacitive coupling between any two conductive elements which have too much "parasitic" capacitance. Running along the edges of the touch-sensor, conductive elements e2, e3, e5 and e6 act as a substitutes for one of the two conductive elements in each of the edge "nodes". This results in some "nodes" having three conductive elements intersecting each other within the one "node".

Conductive elements e1 to e6 may be configured as sensing elements, controlling elements, masking elements or shielding elements.

In this example, along the left side of the touch sensor 1300a:
- Element e1 crosses x/y2, x/y4, x/y6 and x/y8, enabling mutual capacitance sensing at the extreme edge of the sensing area.
- Element e2 crosses the junctions of elements x/y1, x/y2 and x/y4, x/y6.
- Element e3 crosses the junctions of elements x/y2, x/y4 and x/y6, x/y8.

A similar pattern occurs for other conductive elements e4-e6 at the right side of the touch sensor 1300a.

These fourth set of conductive elements e1-e6 may provide very sensitive mutual and/or self capacitance sensing along the extreme edges of the sensing area with minimal visual impact on display area. The fourth set of conductive elements e1-e6 can be considered as having extending portions that extend from a particular edge region into the central region and then back to the same edge region. In this example, each end of the extending portion is connected to an edge-extending-portion that extends along the edge region.

Element e1 may, if required, be joined physically to element e4, as they each cross different sets of elements. In this example, element e1 crosses the elements x/y2, x/y4, x/y6 and x/y8, whereas element e4 crosses element x/y1, x/y3, x/y5 and x/y7. If joined together, the resulting single edge element would cross all the matrix elements, x/y1 to x/y8.

Elements e2 and e5 may be joined together. Element e2 intersects (x/y1 with x/y2) and (x/y4 with x/y6) and element e5 intersects (x/y7 with x/y8) and (x/y3 with x/y5). Together, these two elements uniquely cross all 8 elements x/y1 to x/y8.

Likewise, elements e3 and e6 may also be joined together. Element e3 intersects (x/y2 with x/y4) and (x/y6 with x/y8) and element e6 intersects (x/y5 with x/y7) and (x/y1 with x/y3). Together, these two elements uniquely cross all 8 elements x/y1 to x/y8.

FIG. 13b shows an alternative arrangement of a touch sensor 1300b to the example shown in FIG. 13a. As in the example in FIG. 13a, the touch sensor 1300b comprises a plurality of diagonal conductive elements x/y1-x/y8, which occupy a central region 1310b of the sensing area.

In the touch sensor 1300b of FIG. 13b, the conductive elements e2 and e3 in FIG. 13a are replaced by a single conductive element e2' in FIG. 13b, and the conductive elements e5 and e6 in FIG. 13a are replaced with a single conductive element e3' in FIG. 13b. In FIG. 13b, the conductive element e2' crosses the conductive elements x/y2, x/y4, x/y6 and x/y8 while conductive element e3' crosses conductive elements x/y1, x/y3, x/y5 and x/y7. These crossings usually occur twice. For example, conductive element e2' crosses conductive element x/y4 (highlighted) twice. One crossing occurs at a node between conductive element x/y2 and conductive element x/y4. Another crossing occurs at a node between and conductive element x/y6 and conductive element x/y4. At these crossing points, where three conductive elements intersect at a triple-node, there is a unique combination of conductive elements that distinguishes one from the other, thereby eliminating any ambiguity in the position of a finger. In the example with highlighted element x/y4, at one of the intersections, conductive elements e2', x/y2 and x/y4 intersect, and at the other intersection e2', x/y4 and x/6 intersect. Similar conductive elements to e2' and e3' can be incorporated into the touch sensor across the central region 1310b of the sensing area, as shown by conductive elements t1-t5 in FIG. 13b. The conductive elements t1-t5 within the central region 1310b of the sensing area are parallel with the conductive elements e1'-e4' that extend along the sides of the sensing area. Each of the conductive elements t1-t5, e1'-e4' extends at a diagonal to the diagonal conductive elements x/y1-x/y8. Conductive elements e2', t1-t5, e3' thereby constitute a complete third axis in the touch sensor. Although these conductive elements t1-t5, e1'-e4' require extra terminations to be provided for the touch sensor 1300b, the extra terminations may all be positioned along the first edge 1312 of the touch sensor 1300b, and do not require any "feed" wires along other edges 1314, 1316, 1318 of the touch sensor 1300b.

FIG. 14a shows a touch sensor 1400 with a first set of conductive elements x1-x4, a second set of conductive elements y2-y4 and an optional third set of conductive elements y1 within a sensing area 1409. The sensing area 1409 is rectangular in this example. The sensing area 1409 is bounded by a first edge 1412, an opposing second edge 1414, a third edge 1416 that extends between the first edge 1412 and the second edge 1414, and a fourth edge 1418 that opposes the third edge 1416. The first edge 1412 extends in a first edge direction 1423. Each edge may be considered to be an edge region with substantially no width and substantially all of the sensing area may be considered to be a central region of the sensing area. That is, the edges provide a boundary between an outer, non-sensing zone and a central, sensing area.

The first set of conductive elements x1-x4 extends between the first edge 1412 and second edge 1414. The first set of conductive elements x1-x4 passes through the sensing area 1409 in a first direction 1420 that is oblique to the first edge direction. Each of the first set of conductive elements x1-x4 passes through the sensing area 1409 only once. Each of the first set of conductive elements x1-x4 intersects each of the conductive elements y1-y4 of the second set only once within the sensing area 1409. Each of the conductive elements x1-x4 of the first set does not intersect any of the other conductive elements x1-x4 of the first set within the sensing area 1409.

In FIG. 14a, tracks are taken outside the sensing area 1409 and then brought back in again at another edge. These tracks are capable of sensing but have been moved to positions where they would not normally be touched. Each of the second set of conductive elements y2, y3, y4 comprises a first portion y2a, y3a, y4a, a track portion y2b, y3b, y4b and a second portion y2c, y3c, y4c. The first and second portions y2a, y3a, y4a, y2c, y3c, y4c each pass through the sensing area 1409 in a second direction 1422 that is oblique to the first edge direction 1423. The second direction 1422 is diagonal to the first direction 1420. Each of the first and second portions y2a, y3a, y4a, y2c, y3c, y4c extend through the sensing area 1409 only once and so each of the second set of conductive elements y2-y4 as a whole passes through the sensing area 1409 a plurality of times. The first portions y2a, y3a, y4a extend through the sensing area 1409 between the first edge 1412 and the third edge 1416. The track portions y2b, y3b, y4b connect each of the first portions y2a, y3a, y4a to respective second portions y2c, y3c, y4c outside of the sensing area 1409. In this example, the track portions y2b, y3b, y4b extend around the second edge 1414 and the third edge 1416 of the sensing area 1409. The second portions y2c, y3c, y4c extend through the sensing area 1409 between the second edge 1414 and the fourth edge 1418. Each of the first and second portions y2a, y3a, y4a, y2c, y3c, y4c of the second set of conductive elements intersects each of the first set of conductive elements x1-x4 only once.

The second set of conductive elements y2-y4 enter the sensing area twice, yet never cross an x element more than once. A fourth y element y4 is highlighted in FIG. 14a and its route is discussed below as an example. The fourth y element y4 extends continuously: from a terminal at the first edge 1412 diagonally upward through the sensing area 1409 to the third edge 1416, crossing a fourth x element x4, as a feed track, along the outside the sensing area 1409 to a new start position at the second edge 1414, from the second edge 1414 it then runs diagonally downward through the sensing area 1409 crossing first, second and third x elements x3, x2 and x1 and finishing at the fourth edge 1418.

In this example, the optional third set of conductive elements comprises only a single conductive element y1. The third set of conductive elements extends through the sensing area 1409 only once. The third set of conductive elements extends in the second direction 1422. The third set of conductive elements is disposed between the first portions y2a, y3a, y4a of the second set of conductive elements y2-y4 and the second portions y2c, y3c, y4c of the second set of conductive elements y2-y4. The third set of conductive elements y1 does not intersect any of the second set of conductive elements y2-y4 within the sensing region. The third set of conductive elements intersects each of the first set of conductive elements x1-x4 only once.

In this example, the diagonally wired 4×4 matrix formed by the eight conductive elements x1-x4, y1-y4 provides 16 nodes.

The touch sensor 1400 provides the advantages of diagonal touch sensors described above with reference to FIG. 2 but does not suffer from the disadvantage discussed above because:
   i) the sensor does not require substantially more conductive elements than a conventional touch sensor, such as that described with reference to FIG. 1, with a corresponding number of nodes.
   ii) Terminals for the conductive elements may be provided along just one or two sides of the touch sensor.

Figure 14B:
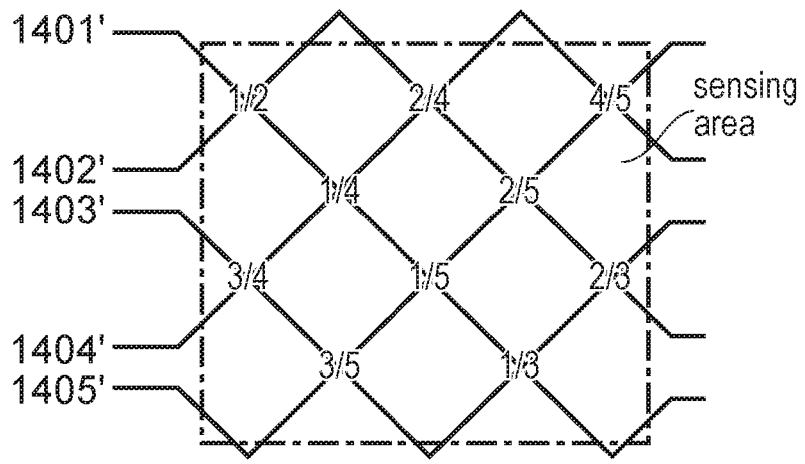
FIGS. 14b to 14d shows how a touch sensor can be extended or reconfigured.

FIG. 14b shows a touch sensor with the same layout as FIG. 3c. This example shows 5 wire conductive elements 1401'-1405'. Each wire crosses each of the other wires once only. With 5 conductive elements there will be 10 unique cross-over points, according to the formula $(n^2-n)/2$, where n is the number of conductive elements. These cross-over points (nodes) are labelled 1/2, 1/3, 1/4, 1/5, 2/3, 2/4, 2/5, 3/4, 3/5, 4/5.

Figure 14C:
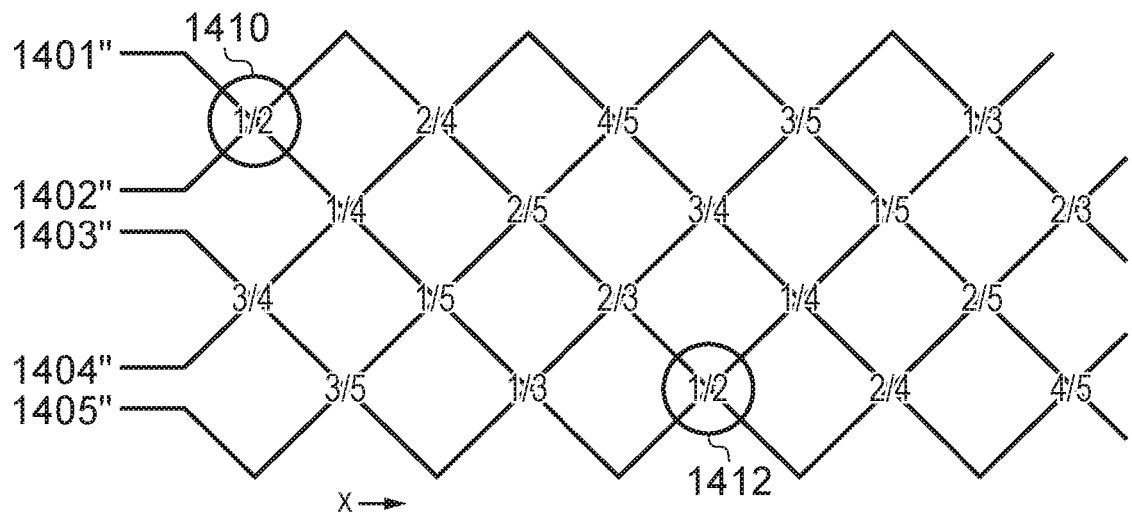

FIG. 14c shows the same touch sensor layout as FIG. 14a, but with the layout pattern formed by conductive elements 1401'-1405' extended in an x-direction. This has the effect of increasing the number of cross-over points, or nodes, causing duplication of some of the cross-over points. In FIG. 14c, the pattern has been extended sufficiently to cause every possible cross-over point to be duplicated, in this example creating 20 cross-over points. That is, the conductive elements cross other conductive elements more than one. For example, as highlighted in FIG. 14c, the first conductive element 1401" forms two nodes (1/2) 1410, 1412 with the second conductive element 1402". In this way, the wiring pattern can be repeated, producing duplicate sets of cross-over points (nodes).

This process could be extended even further to produce triplicate sets of nodes, where each conductive element passes over each other conductive element three times, or to produce quadruple sets of nodes, where each conductive element passes over each other conductive element four times, etc. However, the provision of duplicate nodes may result in ambiguity as to which of the nodes is being touched by a finger.

If the touch sensor of FIG. 14c was terminated at both ends then, because the wire has some significant resistance, the disambiguation process described in US2015/0130749 (A1) could be used to distinguish between the duplicate nodes. This is readily possible as the duplicate nodes are spaced well apart. The process of distinguishing between duplicate nodes could be enhanced by making the layout pattern in each duplicated node asymmetrical, as discussed further below with reference to FIG. 17b.

Figure 14D:
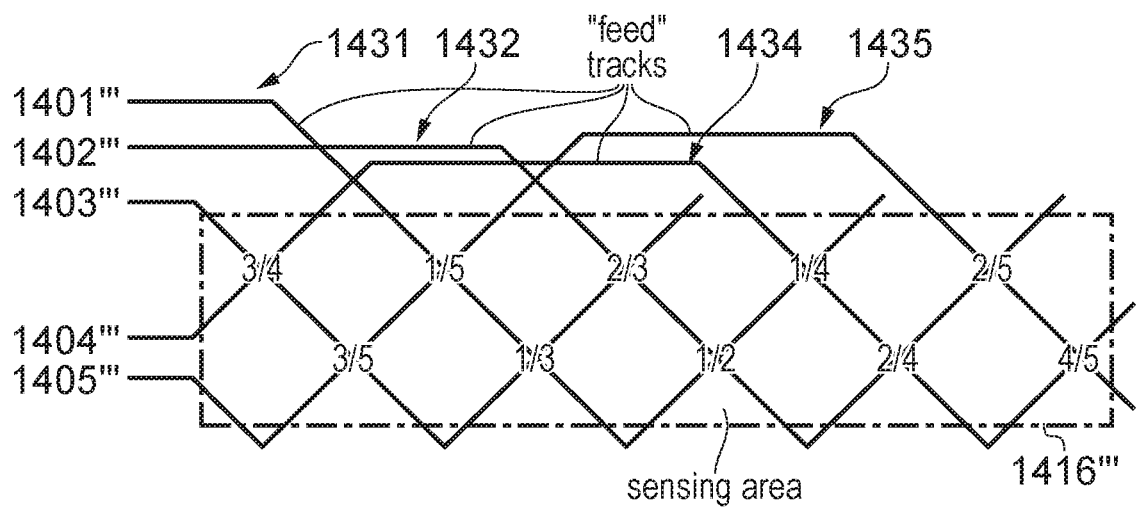

FIG. 14d shows how the top half (as illustrated) of the touch-sensor of FIG. 14c can be eliminated, and replaced with "feed" tracks 1431, 1432, 1434, 1435 for the conductive elements 1401'''-1405''' in a similar manner to that discussed previously with regard to FIG. 10. This arrangement causes 10 of the duplicated cross-over points to be eliminated, and results in each of the remaining cross-over points in a sensing area 1416''' being unique, and identical to those shown in the bottom half of the touch sensor in FIG. 14b. The use of tracks along the side of the sensing area 1416''' enables the shape of the sensing area to be reconfigured to a long thin sensing zone as opposed to a square shape (as seen in FIG. 14a), but without loss in sensing capability. However, for some applications it may be advantageous to avoid the space requirements imposed by feed tracks along the edge of the touch sensor.

Figure 15:
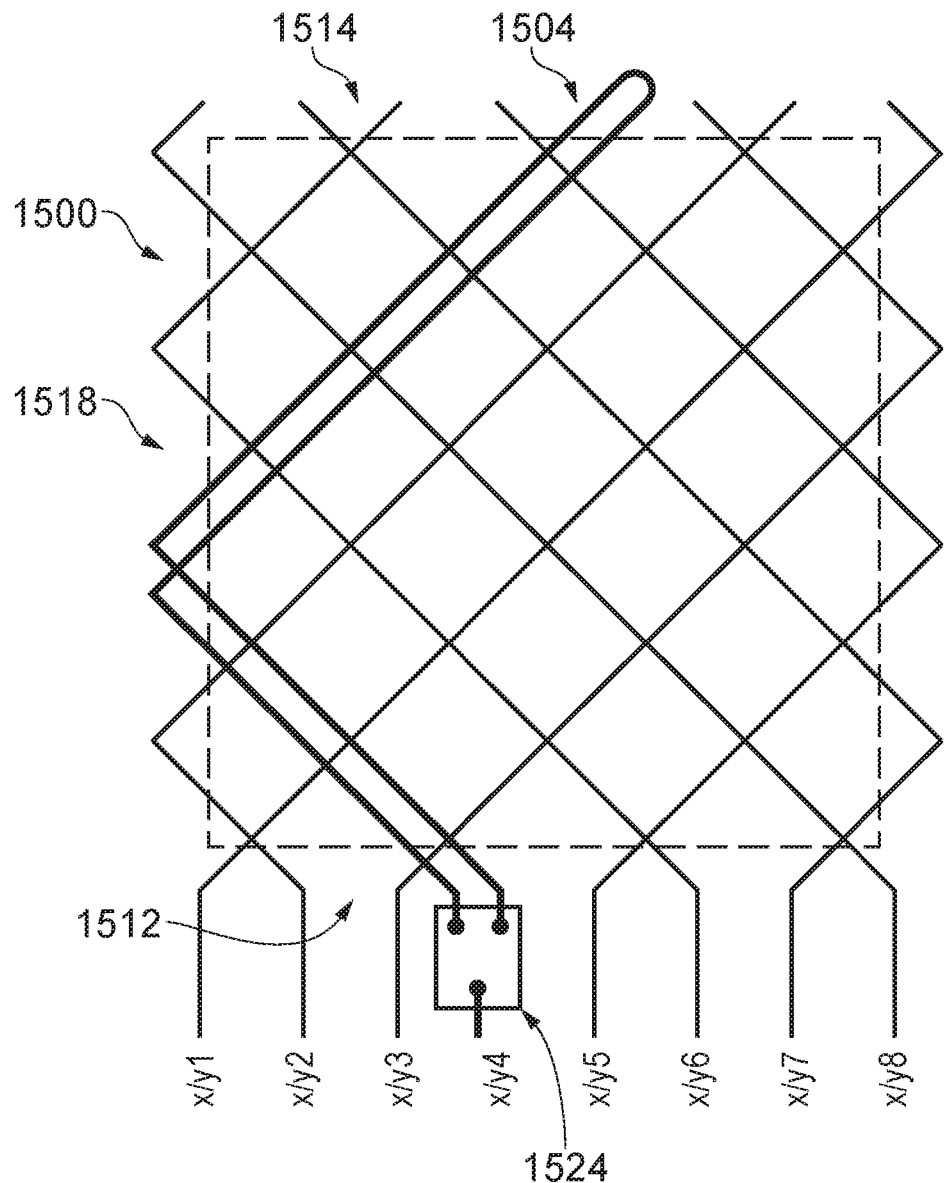
FIG. 15 shows a touch sensor with a conductive element having an enlarged effective width and reduced resistance along its length and terminated at one end only.

FIG. 15 shows a touch sensor 1500 similar to that described above with reference to FIG. 3 in which a wire element 1504 is folded back on itself in order to increase the sensing or controlling area covered by the folded back wire element 1504. Only one folded back wire element 1504 is shown, for clarity, but the same arrangement could apply to all the elements. The folded back wire 1504 is terminated at both of its ends to a common terminal 1524 on one side of the touch sensor 1500.

The wire element 1504 starts at the common terminal t1524 and extends continuously:
   i) from the first edge region 1512 to the fourth edge region 1518, where it changes direction;
   ii) from the fourth edge region 1518 to the second edge region 1514, where it loops back;
   iii) from the second edge region 1514 to the fourth edge region 1518, where it passes over its earlier path and changes direction;
   iv) from the fourth edge region 1518 to the first edge region 1512, where it terminates at terminal 1524.

This arrangement has the advantage over the alternative arrangement described previously with reference to FIG. 9 (in which the wire is terminated at opposing first and second edge regions 1512, 1514) that the resistance of the wire element 1504 between the first edge 1512 and the second edge 1514 is significantly reduced by being effectively two wires in parallel. The reduced resistance enables larger touch-screens to be manufactured, and/or the touch-screen to be made with finer wires.

Figure 16:
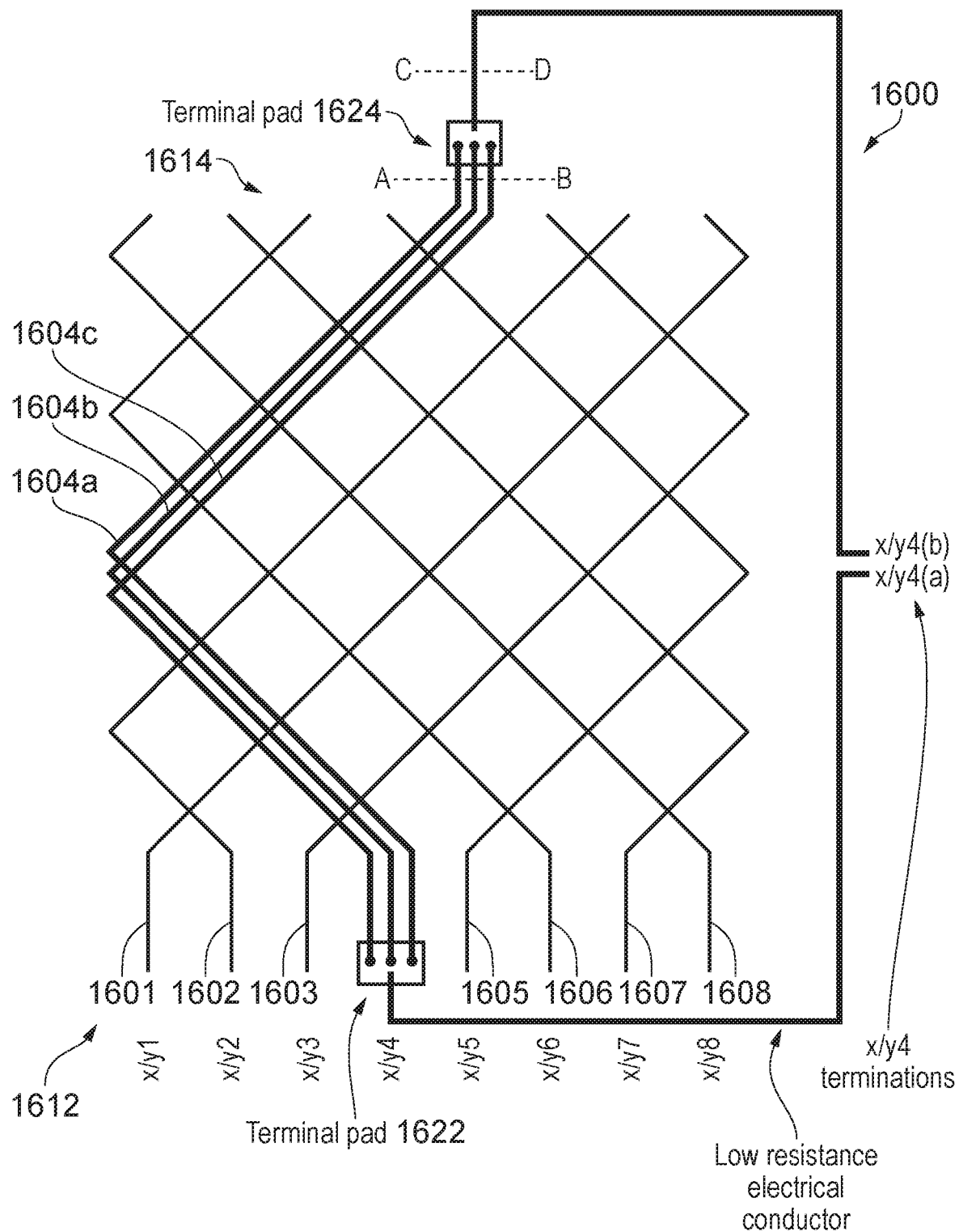
FIG. 16 shows a touch sensor with a conductive element having an enlarged effective width and reduced resistance along its length and terminated at both ends.

FIG. 16 shows a touch sensor 1600 that is similar to that of FIG. 3 with termination at both ends of a plurality of conductive elements 1601-1608 Each conductive element 1601-1608 may, however, be made up of a plurality of sub-elements. Each conductive element is connected to a terminal at the first and second ends 1612, 1614. The provision of a plurality of parallel conduction paths for each conductive element 1601-1608 reduces the electrical resistance of each of the conductive elements 1601-1608.

In one manifestation, the two terminals, at both ends of each of the conductive elements, may be joined together using low resistance wire or tracks to form a common terminal. These tracks may be incorporated into the same medium as the touch-sensor, running within the "non-sensing" zone around the sensing region, or they may be external tracks, such as ribbon cable.

In a second manifestation, where the resistance of the conductive elements is very high, the terminals at each end of a conductive element may be kept separate. In this example, sensing may be performed independently from both ends of the sensing elements.

A fourth conductive element (x/y4) 1604a-c is emphasised for the purpose of clarity in FIG. 16. The other conductive elements may each have a similar structure to the fourth conductive element (x/y4) 1604a-c. The fourth conductive element (x/y4) 1604a-c is terminated at both ends. The termination at the first end 1612 of the touch sensor 1600 is provided by a first terminal pad 1622. The termination at the second end 1614 of the touch sensor 1600 is provided by a second terminal pad 1624. The first and second terminal pads 1622, 1624 may be electrically joined together to form a common terminal. Alternatively, these terminals may be kept electrically isolated from each other, as shown in FIG. 16. This means that a signal x/y4a from the first terminal pads 1622 may be sensed independently from a signal x/y4b from the second terminal pads 1624. The results of the two measurements may be processed to form a value that is a combination of both measurements.

The fourth conductive element (x/y4) 1604a-c comprises a plurality of parallel sub-elements 1604a, 1604b, 1604c. The resistance of the conductive elements in FIG. 16 is reduced by having several sub-elements in parallel, all connected to the same terminals. If the resistance of the sensing elements 1601-1608 is sufficiently low enough to enable a touch position to be sensed along their whole length, then the sensing elements 1601-1608 may be terminated at only one end. This is equivalent to cutting the tracks along the line A-B shown in FIG. 16, and using only as the first terminal pad 1622. Alternatively, the conductive elements may be terminated at both the first and second ends but only sensed from the first end. This is equivalent to cutting the tracks along the line C-D in FIG. 16, and using only the first terminal pad 1622.

FIG. 17a illustrates a touch sensor with 8 conductive elements 1701-1708. A central region 1710 of the sensing area is bounded by a first edge region 1712, a second edge region 1714 that opposes the first edge region 1712, a third edge region 1716 that extends between the first edge region 1712 and the second edge region 1714, and a fourth edge region 1718 that opposes the third edge region 1716. The conductive elements 1701-1708 each pass though both the third and fourth edge regions 1716, 1718 in this example.

The conductive elements 1701-1708 each extend through the central region 1710 from the first edge region 1712 to the second edge 1714 region via the third and fourth edge regions 1716, 1718. The conductive elements 1701-1708 change direction at the third edge region 1716 and the fourth edge region 1718.

The conductive elements 1701-1708 comprises a first set of conductive elements 1701, 1703, 1705, 1707. The first set of conductive elements 1701, 1703, 1705, 1707 extend from the first edge region 1712 to the third edge region 1716, from the third edge region 1716 to the fourth edge region 1718 and from the fourth edge region 1718 to the second edge region 1714.

The conductive elements also comprises a second set of conductive elements 1702, 1704, 1706, 1708. The second set of conductive elements 1702, 1704, 1706, 1708 extend from the first edge region 1712 to the fourth edge region 1718, from the fourth edge region 1718 to the third edge region 1716 and from the third edge region 1716 to the second edge region 1714.

The conductive elements 1701-1708 provide 56 crossover nodes in the sensing region within the central region 1710 of the sensing area. A first conductive element 1701 is highlighted for clarity, but is in other respects similar to the other conductive elements 1702-1708. The cross over nodes 1/6, 6/1 between the first and sixth conductive elements 1701, 1706 are discussed below with reference to second and third nodes 1760, 1770 FIG. 17b.

Figure 17B:
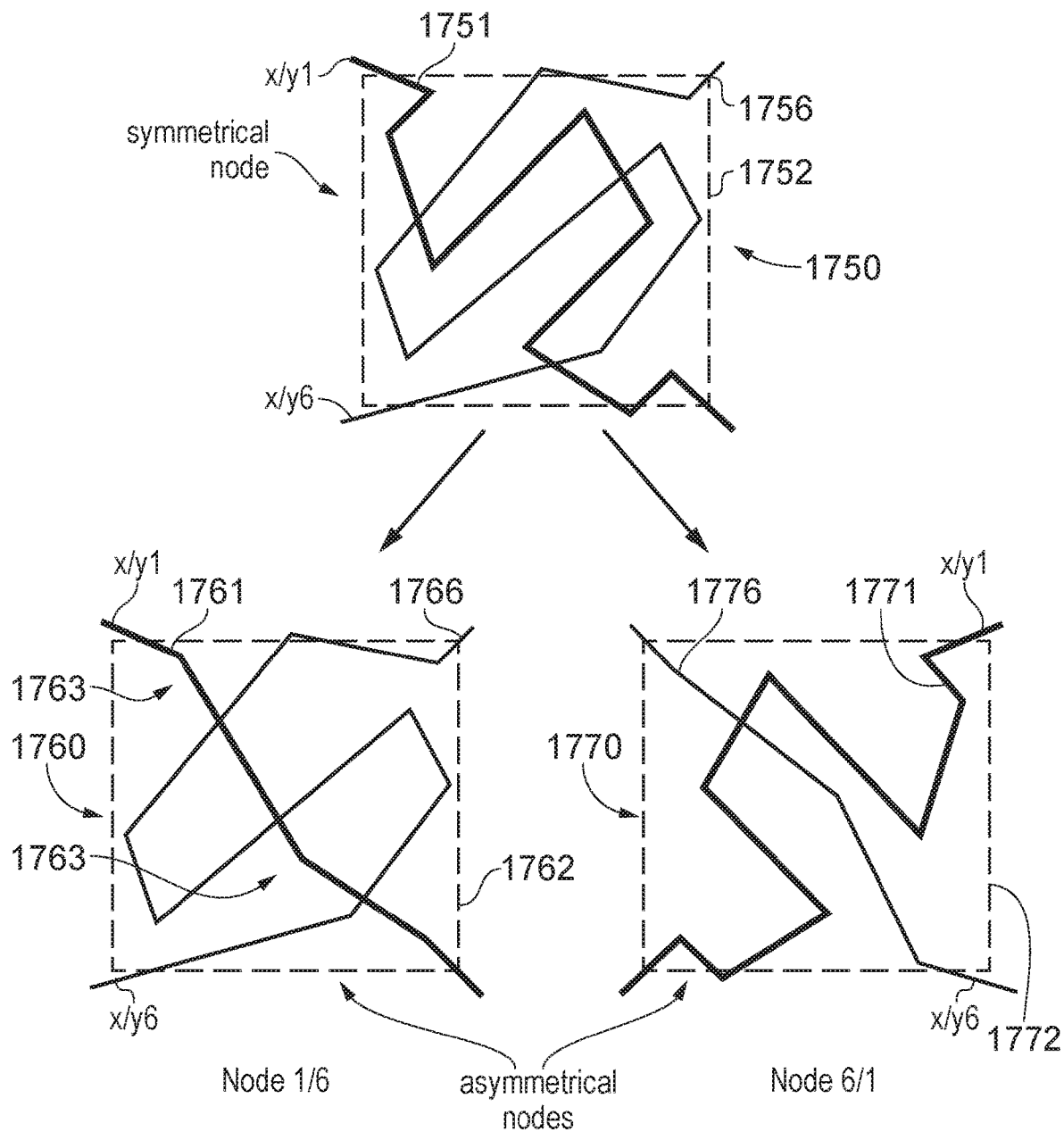
FIG. 17b shows arrangement of nodes for a touch sensor.

FIG. 17b illustrates three complex interdigitated nodes. A first node 1750 is similar to that described previously with reference to FIG. 7b. The node may be considered to be 'symmetrical' in that, of the two conductive elements 1751, 1756 within the first node 1750, there is about an equal amount of each conductive element 1751, 1756 within a square unit area 1752 of the first node 1750. The arrangements of the conductive elements 1751, 1756 themselves are not necessarily symmetrical.

FIG. 17b also illustrates a second node 1760 and the third node 1770 for providing as nodes 1/6 and 6/1 in FIG. 17a.

The second and third nodes 1760, 1770 may be considered to be 'asymmetrical', in that there is significantly more of one conductive element than there is of the other within a square unit area 1762, 1772 of the respective second and third nodes 1760, 1770.

In the example illustrated in FIG. 17b, the second node 1760 has an 'S' shaped conductive element 1766 that is similar to that of the first node 1750. The second node 1760 also has a relatively straight, linear conductive element 1761. The linear conductive element 1761 has minor inflections 1763 in order to reduce reflections and slightly increase the length of the linear conductive element 1761 within the square unit area 1762 of the second node 1760. The linear conductive element 1761 is generally perpendicular to the 'S' shaped conductive element 1766 at the intersection between the conductive elements 1761, 1766

The third node 1770 has a 'W' shaped conductive element 1771 instead of an 'S' shaped conductive element. The third node 1770 also has a relatively straight, linear conductive element 1771 that is similar to that of the second node 1760. The linear conductive element 1771 is generally perpendicular to the 'W' shaped conductive element 1776 at the intersection between the conductive elements 1771, 1776. Although 'S' and 'W' shaped conductive elements were used in the example of FIG. 17b, many other shapes may be used.

Throughout the present specification, the descriptors relating to relative orientation and position, such as "horizontal", "vertical", "top", "bottom" and "side", are used in the sense of the orientation of the touch sensor or touch screen as presented in the drawings. However, such descriptors are not intended to be in any way limiting to an intended use of the described or claimed invention.

It will be appreciated that any components that are described or illustrated herein as being coupled or connected could be directly or indirectly coupled or connected. That is, one or more components could be located between two components that are said to be coupled or connected whilst still enabling the required functionality to be achieved.

The invention claimed is:

1. A touch sensor comprising:
    a sensing area having a central region bounded by at least one edge region that extends in an edge region direction; and
    a plurality of touch sensing conductive elements that each extend through the central region in a direction that is oblique to the edge region direction, in which the central region of the sensing area is bounded by a first edge region, a second edge region that opposes the first edge region, and a third edge region that extends between the first edge region and the second edge region, the plurality of touch sensing conductive elements comprises a first set of touch sensing conductive elements that each extend through the central region from the first edge region to the second edge region via the third edge region:
    in which each touch sensing conductive element of the first set of touch sensing conductive elements comprises a first portion that extends through the central region in a first direction between the first edge region and the third edge region,
    in which the touch sensing conductive elements of the first set each change direction at the third edge region,
    in which each touch sensing conductive element of the first set of touch sensing conductive elements comprises a second portion that extends through the central region in a second direction between the third edge region and the second edge region, and in which the central region of the sensing area is bounded by a fourth edge region that extends between the first edge region and the second edge region and opposes the third edge region, the plurality of touch sensing conductive elements comprises a second set of touch sensing conductive elements that each extend from the first edge region to the second edge region via the fourth edge region, in which the touch sensing conductive elements of the second set each change direction at the fourth edge region, in which the second set of touch sensing conductive elements are separate from the first set of touch sensing conductive elements.

2. The touch sensor of claim 1 in which the first and second sets of touch sensing conductive elements are arranged such that each touch sensing conductive element crosses each of the other conductive elements.

3. The touch sensor of claim 2 in which each touch sensing conductive element crosses each of the other touch sensing conductive elements only once.

4. The touch sensor of claim 1 in which the first set of touch sensing conductive elements passes through the third edge region only once and in which the second set of touch sensing conductive elements passes through the fourth edge region only once.

5. The touch sensor of claim 1 in which the first and second sets of conductive elements form a matrix of cross over points.

6. The touch sensor of claim 5 in which the edge regions form a periphery around the bounds of the matrix of cross over points.

7. The touch sensor of claim 1 in which the first set of touch sensing conductive elements is interdigitated with the second set of touch sensing conductive elements at the first edge region.

8. The touch sensor of claim 1 in which the first and second set of touch sensing conductive elements are connected to circuitry only at the first edge region.

9. The touch sensor of claim 1 in which the first set of touch sensing conductive elements is configured to be connected to circuitry at the first edge region and the second set of touch sensing conductive elements is configured to be connected to circuitry at the second edge region, in which the touch sensing conductive elements each have two ends and are each configured to be connected to circuitry at only one of the two ends.

10. The touch sensor of claim 1 in which the touch sensing conductive elements of the first set each have a non-linear portion, and in which the touch sensing conductive elements of the second set each have a non-linear portion.

11. The touch sensor of claim 1 in which the first and second sets of touch sensing conductive elements are connected to circuitry at both the first edge region and the second edge region.

12. The touch sensor of claim 1, in which the plurality of touch sensing conductive elements comprises a third set of touch sensing conductive elements that extends between the third edge region and the fourth edge region, and in which the third set of touch sensing conductive elements extends diagonally with respect to a direction in which the first or second edge region extends.

13. The touch sensor of claim 1 in which the plurality of touch sensing conductive elements comprises a fourth set of touch sensing conductive elements that extends along one or more of the edge regions of the sensing area.

14. The touch sensor of claim 1 in which the first set of touch sensing conductive elements that passes through the central region of the sensing area once; and each of the touch sensing conductive elements of the second set:
intersect with each of the touch sensing conductive elements of the first set once within the central region of the sensing area; and
pass through the central region of the sensing area a plurality of times.

15. The touch sensor of claim 14 in which:
the central region of the sensing area is bounded by a first edge region, a second edge region that opposes the first edge region, a third edge region that extends between the first edge region and the second edge region, and fourth edge region that extends between the first edge region and the second edge region and opposes the third edge region,
the first set of touch sensing conductive elements extends between the first and second edge regions,
the second set of touch sensing conductive elements has a first portion that extends between the first edge region and the third edge region, and
the second set of touch sensing conductive elements has a second portion that extends between the second edge region and the fourth edge region.

16. The touch sensor of claim 1 in which all parts of the touch sensing conductive elements of the first set of touch sensing conductive elements that extend through the central region in a direction between the first edge region and the second edge region do so first by extending from the first edge region to the third edge region, changing direction at the third edge region, then extending from the third edge region through the central region to the second edge region.

17. A touch screen comprising:
a display screen having a display area; and
a touch sensor having a sensing area having a central region bounded by at least one edge region that extends in an edge region direction, and a plurality of touch sensing conductive elements that each extend through the central region in a direction that is oblique to the edge region direction,
in which the central region of the sensing area is bounded by a first edge region, a second edge region that opposes the first edge region, a third edge region that extends between the first edge region and the second edge region, and a fourth edge region that extends between the first edge region and the second edge region and opposes the third edge region, the plurality of touch sensing conductive elements comprises a first set of touch sensing conductive elements that each extend through the central region from the first edge region to the second edge region via the third edge region:
in which each touch sensing conductive element of the first set of touch sensing conductive elements comprises a first portion that extends through the central region in a first direction between the first edge region and the third edge region,
in which the touch sensing conductive elements of the first set each change direction at the third edge region,
in which each touch sensing conductive element of the first set of touch sensing conductive elements comprises a second portion that extends through the central region in a second direction between the third edge region and the second edge region,
in which the plurality of touch sensing conductive elements comprises a second set of touch sensing conductive elements that each extend from the first edge region to the second edge region via the fourth edge region, and in which the touch sensing conductive elements of the second set each change direction at the fourth edge region, in which the second set of touch sensing conductive elements are separate from the first set of touch sensing conductive elements; and in which the sensing area is aligned with the display area.

18. The touch screen of claim 17 in which the display area comprises an array of picture elements having columns and rows of picture elements, wherein the first set of touch sensing conductive elements of the touch screen extends obliquely to a row or column of picture elements.

19. The touch sensor of claim 17 in which the touch sensing conductive elements of the first set extend from the first edge region to the second edge region, firstly via the third edge region, and then via the fourth edge region, in which the touch sensing conductive elements of the second set extend from the first edge region to the second edge region, firstly via the fourth edge region, and then via the third edge region, wherein each of the touch sensing conductive elements cross each of the other touch sensing conductive elements a maximum of two times.

* * * * *